US012695203B2

(12) United States Patent
Forster

(10) Patent No.: US 12,695,203 B2
(45) Date of Patent: Jul. 28, 2026

(54) ANTENNA DESIGNS FOR WIDE-BAND, ORIENTATION INSENSITIVE RFID DEVICES

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 94 days.

(21) Appl. No.: 18/718,497

(22) PCT Filed: Jan. 6, 2023

(86) PCT No.: PCT/US2023/060262
§ 371 (c)(1),
(2) Date: Jun. 11, 2024

(87) PCT Pub. No.: WO2023/133528
PCT Pub. Date: Jul. 13, 2023

(65) Prior Publication Data

US 2025/0055200 A1 Feb. 13, 2025

Related U.S. Application Data

(60) Provisional application No. 63/296,963, filed on Jan. 6, 2022.

(51) Int. Cl.
*H01Q 13/16* (2006.01)
*H01Q 1/22* (2006.01)
(Continued)

(52) U.S. Cl.
CPC ........... *H01Q 13/16* (2013.01); *H01Q 1/2208* (2013.01); *H01Q 5/378* (2015.01); *H01Q 21/24* (2013.01)

(58) Field of Classification Search
CPC .. G06K 19/07773; H01Q 1/2208; H01Q 1/38; H01Q 13/16; H01Q 21/24; H01Q 5/378; H01Q 7/00
See application file for complete search history.

(56) References Cited

U.S. PATENT DOCUMENTS 7,501,955 B2 3/2009 Forster et al.
7,876,227 B2 1/2011 Bellows
(Continued)

FOREIGN PATENT DOCUMENTS

WO 2014/210000 12/2014

OTHER PUBLICATIONS

International Search Report and Written Opinion dated Apr. 17, 2023 issued in corresponding IA No. PCT/US2023/060262 filed Jan. 6, 2023.

*Primary Examiner* — Thien M Le

(57) ABSTRACT

The present subject matter provides an RFID device that operates in wide-band and is orientation insensitive. The RFID device includes a first resonator and a second resonator. The first resonator includes a sheet of electrically conductive material, defining an area covered by a perimeter. The RFID device also includes a slot defined by opposing sides and the slot being extended from an open end of an edge of the perimeter of the sheet to a closed end stretching within an internal region of the sheet. The RFID device includes a conductive member placed between the open end and closed end and is contoured by the slot in between. The second resonator includes a loop conductor coupled to an integrated circuit (chip). The second resonator is contained within the closed end of the slot and is spaced by a gap from the opposing sides. The RFID device is formed on a substrate.

34 Claims, 15 Drawing Sheets

(51) Int. Cl.
*H01Q 5/378* (2015.01)
*H01Q 21/24* (2006.01)

(56) References Cited

U.S. PATENT DOCUMENTS

| | | | | |
|---|---|---|---|---|
| 8,711,046 | B2 | 4/2014 | Copeland et al. | |
| 9,600,758 | B2 | 3/2017 | Jeppesen | |
| 9,818,056 | B2 | 11/2017 | Forster | |
| 10,944,153 | B1 | 3/2021 | Yarga et al. | |
| 2006/0044769 | A1 | 3/2006 | Forster et al. | |
| 2011/0019250 | A1* | 1/2011 | Aiki | G02B 5/32 359/861 |
| 2011/0215680 | A1* | 9/2011 | Yamada | H03H 9/19 310/370 |
| 2018/0123221 | A1* | 5/2018 | Finn | G06K 19/07786 |
| 2019/0165447 | A1* | 5/2019 | Furlan | H01Q 1/48 |
| 2020/0021272 | A1* | 1/2020 | Segovia Fernandez | H03B 5/326 |
| 2020/0302764 | A1 | 9/2020 | Forster | |
| 2020/0343648 | A1* | 10/2020 | Tehran | H01Q 1/24 |
| 2021/0007822 | A1* | 1/2021 | Pruckner | A61C 19/02 |
| 2021/0081748 | A1* | 3/2021 | Finn | G06K 19/07722 |
| 2021/0234254 | A1* | 7/2021 | Dai | H01Q 13/10 |
| 2021/0305718 | A1* | 9/2021 | Li | H01Q 5/48 |
| 2023/0178755 | A1* | 6/2023 | Richey | H01M 50/184 429/146 |
| 2023/0318186 | A1* | 10/2023 | Magill | H01Q 9/045 343/769 |
| 2025/0357680 | A1* | 11/2025 | Mckerricher | H01Q 15/14 |

* cited by examiner

ANTENNA DESIGNS FOR WIDE-BAND, ORIENTATION INSENSITIVE RFID DEVICES

CROSS-REFERENCE TO RELATED APPLICATIONS

The present application is a national stage application under 35 U.S.C. § 371 of international Application No. PCT/US2023/060262, which was published in English on Jul. 13, 2023, which claims the benefit of U.S. Provisional Patent Application No. 63/296,963 filed Jan. 6, 2022, each of which is incorporated by reference herein in its entirety.

FIELD

Antenna designs, particularly RFID antenna designs, and RFID devices including the same that provide both wide bandwidth and orientation insensitivity and methods of making and using thereof are described herein.

BACKGROUND

Wireless identification devices, such as RFID devices, are widely used in tracking and tracing of objects by associating unique identification codes and/or product codes or related information thereto. For example, wireless identification can be used for tracing and tracking of objects in warehouses and/or manufacturing sites or inventories, and various applications associated therewith.

RFID systems typically include a combination of RFID tags and RFID readers. RFID tags typically contain a substrate material (e.g., plastic, paper, etc.), a conductive structure or antenna (e.g., metallic, semi-metallic, organometallic, or organic materials) and an integrated circuit (IC or chip). Additional components can be included depending on the desired functionality chip (e.g., dual mode, etc.).

In some embodiments, the antenna is a dipole antenna. The device/antenna can be tuned to respond to predefined resonance frequency or in a predefined resonance frequency range.

When reading a plurality of RFID tagged items, accuracy of the count of the tagged items and associated information is required. Conventional RFID tags are often provided with a single dipole antenna (planar) configured to operate at a predefined resonance frequency (for example Ultra high frequency UHF RFID tags function at UHF frequency). However, there are limitations with such single dipole antennas. For example, the RFID tags are sensitive to orientation, thus potentially jeopardising the reading accuracy. For example, RFID tagged items can be placed in a random manner and/or in a disorganised orientation. In such a scenario, the accuracy of getting an exact count of the RFID tagged items is not feasible or is inaccurate. Consequently, the efficiency of the entire tracking and tracing system is reduced.

Developments have been made in an attempt to improve read accuracy. For example, dual dipole RFID tags have been developed to improve orientation insensitivity. Furthermore, dual dipole RFID tags can be provided in crossed configuration to facilitate orientation insensitivity. Such dual dipole RFID tags can be configured with two RF power inputs and two RF power outputs, where the sum of rectified RF power from the inputs is required. When the crossed dual dipole is oriented to be read in an edge-on orientation, then the crossed dipole is a function of the cosine of the relative angle, with nulls enacted at 90° and 270° orientations with respect of one dipole to the other. However, the other dipole, as it crosses the first one at 90°, peaks at the same point, so RF power received by the chip is the composite of the power from the two dipoles. In theory, the received radiation pattern of the dual dipole RFID tags is 100% orientation insensitive. However, real time radiation of dual dipole RFID tag is inefficient in providing orientation insensitivity due to peaks that occur at the edges only and relatively lower reflection at the quadrants.

Moreover, there are disadvantages associated with the construction of crossed dual dipole devices, namely the requirement of a minimum four connection points, complex assembly, decreased reliability, larger chip size, and therefore higher input cost, for a given semiconductor process. Moreover, complex configuration and larger sized chips may also limit the applicability of RFID tags and devices, where a smaller input is required for different use cases.

Further, operating frequencies of UHF RFID readers vary in different geographical locations. For example, a standard acceptable operating frequency of UHF range significantly varies in different geographical locations such as ETSI (~EU) band i.e. 860-875 MHz and FCC (~US) i.e. 890-930 MHZ, as per country standards or governing body standards. In such scenarios, conventional wireless communication devices or UHF RFID tags or dual dipole RFID tags are required to operate at resonance frequency requirements for ETSI (~EU) and FCC (~US) standards. Since, the tracking and tracing for supply chain management of goods have been scaled globally, it is necessary that devices used for supply chain management can communicate on different frequencies so that one device may be used for various applications. Currently, conventional wireless communications devices adapted for informative and tracking purposes are limited to communication at only one frequency for the United States or abroad. In such a situation, along with the orientation sensitivity described above, there are limitations with respect to the operating frequency of a single tag to operate in different geographical locations.

There is a need to overcome the abovementioned limitations and drawbacks related to conventional wireless communication devices i.e. RFID tags. Furthermore, there is a need for RFID tags that are capable of operating at the frequencies of various geographical locations with efficient orientation insensitivity.

Therefore, it is an object of this disclosure to provide RFID devices, and methods of making and using thereof, that overcome the design, cost, and performance limitations described above. It is further an object of this disclosure to RFID devices, and methods of making and using thereof, capable of operating at the frequencies of various geographical locations with efficient orientation insensitivity.

SUMMARY

The following presents a general summary in order to provide a basic understanding of some aspects of the disclosed innovation. This summary is not an extensive overview, and it is not intended to identify or limit key/critical elements or to delineate the scope thereof. Its sole purpose is to present some concepts in a general form as a prelude to the more detailed description that is presented later.

RFID devices, and methods of making and using thereof, with increased or improved orientation insensitivity and the ability to operate at multiple frequencies/frequency ranges are described herein.

In some embodiments, the RFID device contains a first resonator including a sheet of electrically conductive material and defining an area covered by a perimeter. In some embodiments, the first resonator is manufactured using a sheet conductor from an electrically conductive material, e.g. aluminium, but other conducing materials, metallic, semi-metallic, inorganic, or organic can also be used. In some embodiments, the first resonator may include an area defined as a particular shape, e.g. square, rectangle, triangle, circle, and/or parallelogram, or an irregular shape.

In some embodiments, the device is as described above and the RFID device contains a slot defined by opposing sides, the slot being extended from an open end of an edge of the perimeter of the sheet to a closed end stretching within an internal region of the sheet. In some embodiments, the RFID device contains a conductive member placed between the open end and the closed end and is contoured by the slot in between. Furthermore, in some embodiments, the open end is connected to the circular closed end with a conductive member. In some embodiments, the closed end of the slot is a circular closed end and the conductive member extends around the open end and contoured by the slot. In other embodiments, the first resonator resonates when asymmetric current follows a path, wherein the path is a function of the shape and dimension of the sheet. In some embodiments, the opposing sides of the slots starts at the open end and extend gradually into the internal region of the sheet. In some embodiments, the opposing sides merge with each other at the closed end.

In some embodiments, the first resonator is configured to operate at a first frequency. In some embodiments, the conductive member is configured to tune the first resonator to resonate at the first frequency. In some embodiments, the conductive member is a capacitor. Furthermore, in some embodiments, the resonance of the first resonator is a function of a capacitive reactance of the capacitor and the reactive inductance of the sheet. In some embodiments, the capacitor used herein is selected from the group consisting of an inter-digital capacitor, a parallel plate capacitor, and/or a material comprising a conductive connection. In a preferred embodiment, the capacitor is an inter-digital capacitor.

In some embodiments, the RFID device contains a second resonator and a substrate. In some embodiments, the second resonator contains a loop conductor coupled to an integrated circuit (IC or chip). In some embodiments, the second resonator is contained within the circular closed end of the slot and is spaced by a gap from the opposing sides. Furthermore, in some embodiments, the first resonator and the second resonator are formed on the substrate. In other embodiments, the second resonator is inductively coupled to the first resonator. In another embodiment, the second resonator is capacitively coupled to the first resonator.

In some embodiments, the second resonator is configured to operate at a second frequency. Furthermore, in some embodiments, the second resonator is tuned with the chip to resonate at the second frequency. In some embodiments, a resonant response of the second resonator is a function of impedance of the chip and inductive reactance of the loop conductor. In some embodiments, the chip is an RFID chip or an integrated circuit. Furthermore, in some embodiments, the impedance of the chip is one or more of a function of a parallel capacitance (Cp), parallel inductance (Xp), parallel resistance (Rp), and combinations thereof. In some embodiments, the shape of the loop conductor is one of a circular, elliptical, square, rectangular, and triangular. In some embodiments, the loop conductor in the second resonator is electrically coupled to the chip. In another embodiment, the loop conductor in the second resonator is inductively coupled to the chip.

In some embodiments, the second resonator contains a feeding structure configured to receive an incoming RF signal. In some embodiments, the feeding structure is configured to feed RF power to the first and second resonators, received from the incoming RF signal. Furthermore, in some embodiments, the first and second resonators are triggered with fed RF power to produce a radiation pattern. Notably, in some embodiments, the radiation pattern may be circularly polarized or elliptically polarized.

In some embodiments, the RFID tag including RFID device exhibits improved performance compared to commercially available dual dipole tags, e.g., AD681, on difficult dielectrics, such as those provided by NXP. On low dielectric materials, modified tuning, to drop the response down in frequency, may give a better match. Performance for the RFID Device is typically better edge on rather than face on, and the sloop is polarization sensitive face on unlike the AD681.

In some embodiments, a method for operating an RFID device is also disclosed. The method contains providing a first resonator. In some embodiments, the first resonator contains a sheet and a conductive member. In some embodiments, the method also contains positioning a second resonator within the first resonator. In some embodiments, the second resonator contains a loop conductor and an RFID chip. In some embodiments, positioning the second resonator includes placing the second resonator within the first resonator, leaving a gap between the first resonator and the second resonator. In some embodiments, the method also includes exposing the first resonator and the second resonator to an RF signal. In some embodiments, exposing includes interrogating the RFID device via an interrogator. In some embodiments, the interrogation includes transmission of an interrogation signal to retrieve data from the RFID device through RFID chip.

In some embodiments, the first resonator and the second resonator may be influenced under electromagnetic radiation. In some embodiments, the first resonator and the second resonator may be influenced/interrogated/read by an RFID reader. In some embodiments, the method includes feeding RF power to the second resonator via a feeding structure. In some embodiments, the feeding structure is connected to the loop conductor. In some embodiments, the method includes inducing the RF power to the first resonator coupled to the second resonator. In some embodiments, the method also includes exciting the first resonator and the second resonator to operate at an operating frequency. In some embodiments, the method includes tuning the first resonator using the conductive member and the second resonator using the RFID chip to resonate at the operating frequency. In accordance with an embodiment, the operating frequency is a composite frequency of the RFID device. The operating frequency includes a first frequency or a second frequency. In an embodiment, the tuning comprises performing impedance matching for the first resonator with a capacitive reactance of the conductive member to operate at the operating frequency. In another embodiment, the tuning includes performing impedance matching for the second resonator with the RFID chip to operate at the operating frequency. The method accomplishes with radiating an output RF signal in response to the fed RF signal. The method further includes forming the first resonator and the second resonator on a substrate.

To the accomplishment of the foregoing and related ends, certain illustrative aspects of the disclosed innovation are described herein in connection with the following description and the annexed drawings. These aspects are indicative, however, of but a few of the various ways in that the principles disclosed herein may be employed and are intended to include all such aspects and their equivalents. Other advantages and novel features will become apparent from the following detailed description when considered in conjunction with the drawings.

BRIEF DESCRIPTION OF THE DRAWINGS

The summary above, as well as the following detailed description of illustrative embodiments, is better understood when read in conjunction with the appended drawings. For the purpose of illustrating the present subject matter, exemplary constructions of the subject matter are shown in the drawings. However, the present subject matter is not limited to specific methods and instrumentalities disclosed herein. Moreover, those in the art will understand that the drawings are not to scale. Wherever possible, like elements have been indicated by identical numbers.

Embodiments of the present subject matter will now be described, by way of example only, with reference to the following diagrams wherein.

Figure 1A:
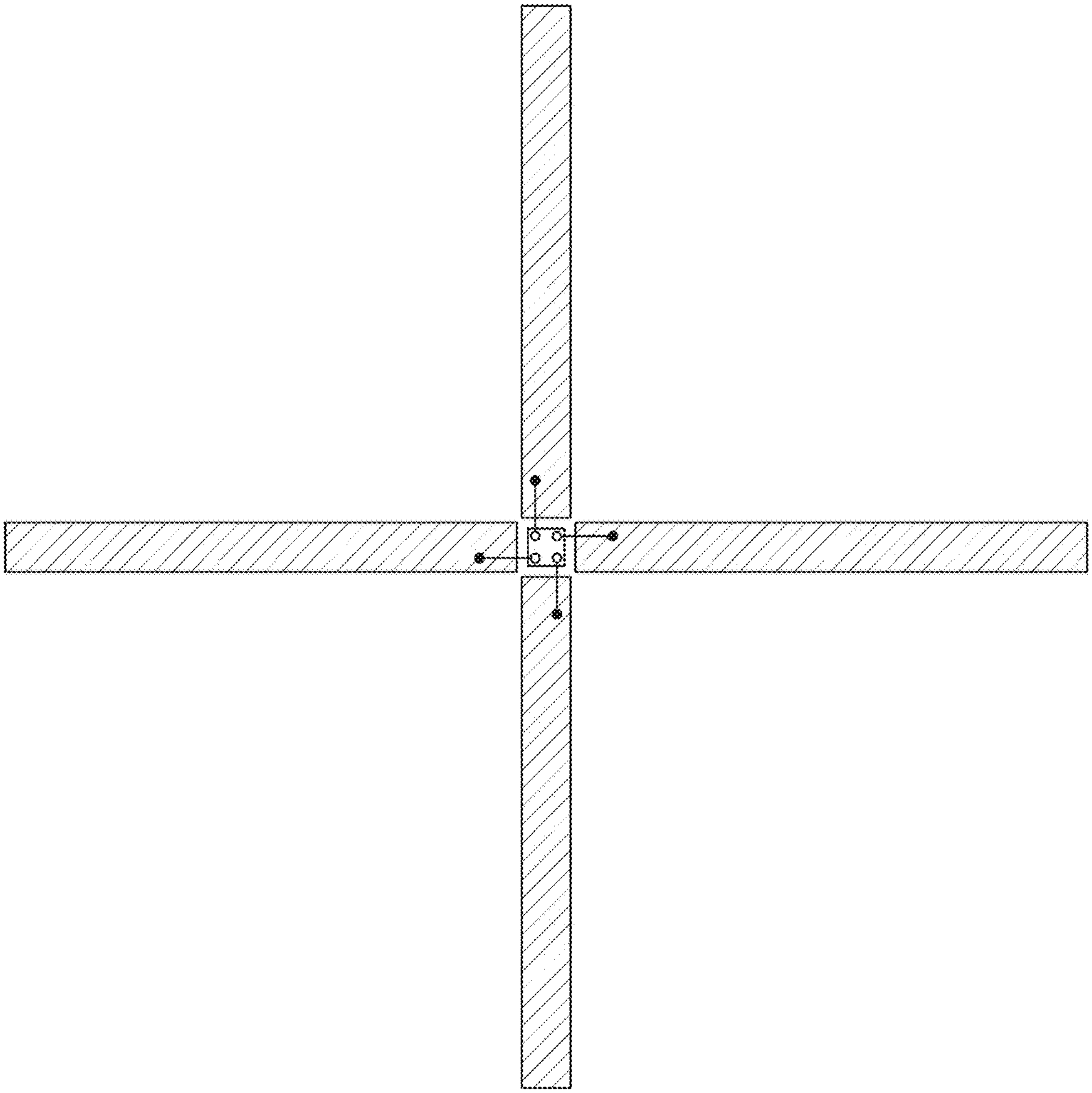
FIG. 1A PRIOR ART
FIG. 1A through 1C illustrates a prior art example of a dual port chip having two (2) radio frequency (RF) inputs.
Figure 1B:
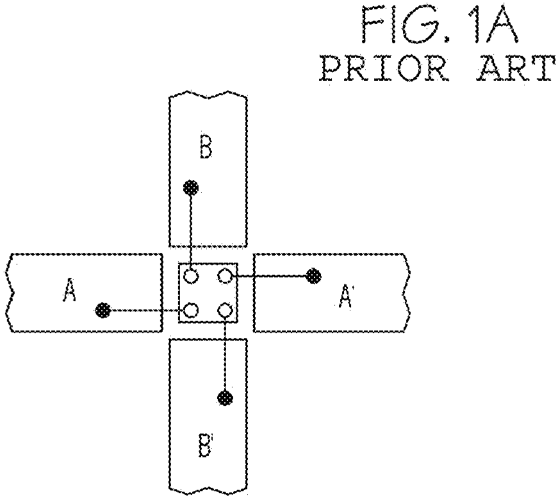
FIG. 1B PRIOR ART
Figure 1C:
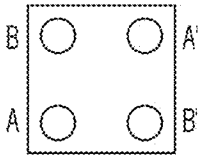
FIG. 1C PRIOR ART
Figure 2:
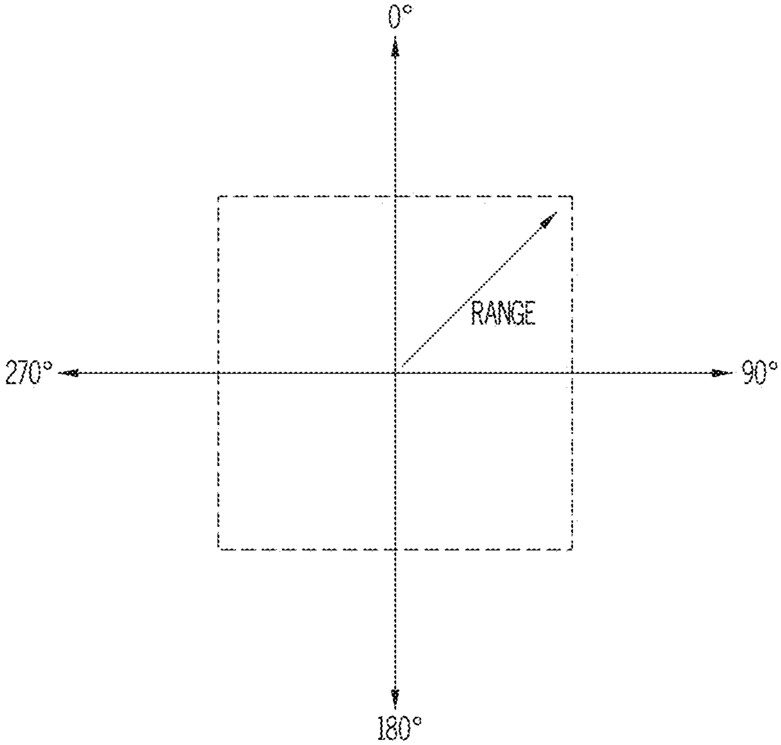
FIG. 2 PRIOR ART
FIG. 2 illustrates a prior art example of the radiation pattern of a crossed dipole.
Figure 3:
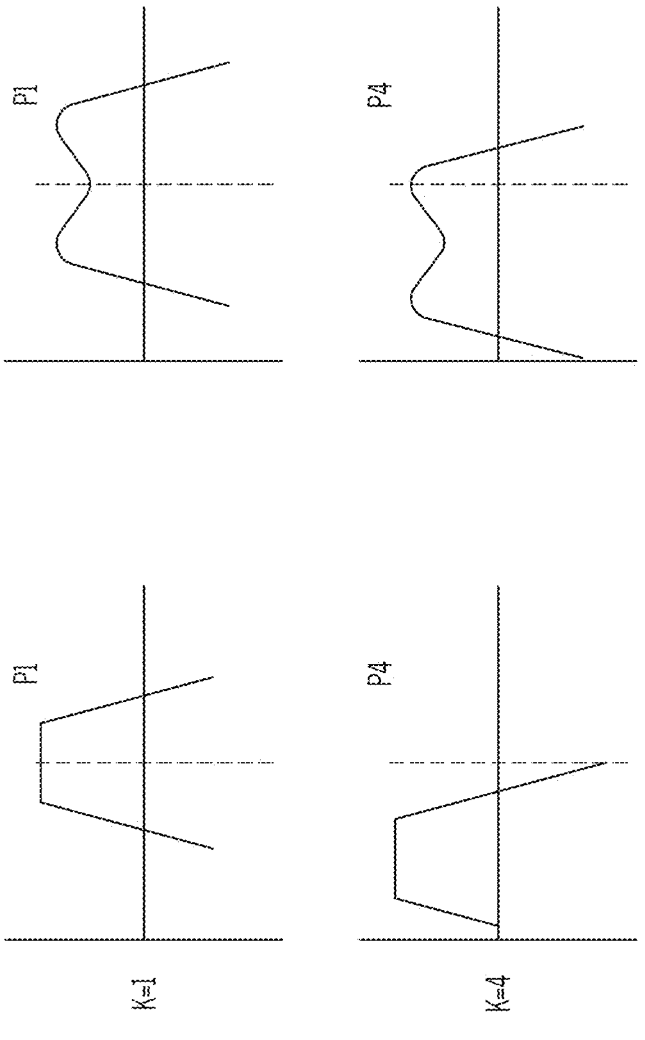
FIG. 3 PRIOR ART
FIG. 3 illustrates a prior art example of a graph showing the difference between narrow- and wide-band tags with varying dielectric.

In the accompanying drawings, an underlined number is employed to represent an item over that the under lined number is positioned or an item to that the under lined number is adjacent. A non-underlined number relates to an item identified by a line linking the non-underlined number to the item. When a number is non-underlined and accompanied by an associated arrow, the non-underlined number is used to identify a general item at that the arrow is pointing.

DETAILED DESCRIPTION

In overview, some embodiments of the present subject matter relate to identifying association of an entity. Some embodiments include providing validated associations of the entity, and the associations may be determined based on at least one of: frequency, proximity, and semantics thereof.

The following detailed description illustrates various embodiments of the present subject matter and ways in that they may be implemented. Although some modes of carrying out the present subject matter have been disclosed, those skilled in the art would recognize that other embodiments for carrying out or practicing the present subject matter are also possible. Some disclosed embodiments include one or more devices, and/or systems for achieving orientation insensitivity and wide bandwidth to the RFID devices have been disclosed herein. Furthermore, terms RFID devices or sloop antenna devices refers to the wireless identification devices discussed in detail in the embodiments of the present subject matter.

I. Definitions

"Capacitor" as used herein refers to an electrical device that includes two conducting plates separated by an insulating material called a dielectric.

"Inter-digital capacitor", as used herein, refers to a multi-finger periodic structure for radio frequency development. Interdigital capacitors use the capacitance that occurs across a narrow gap between conducting elements.

"RFID" as used herein refers to radio frequency identification devices.

"Resonator" as used herein refers to a component or material that pertains electrical resonance, particularly in response to radio waves. As used herein the resonator may include a first resonator and a second resonator.

"RFID Device" as used herein in refers to a device in general that includes an antenna and an integrated circuit (chip).

"Sloop" as used herein refers to a hybrid antenna structure that includes both a loop antenna and a slot antenna.

"Substrate" as used herein refers to a dielectric material. The dielectric material is a non-metallic substance having a high specific resistance.

"RFID tag" as used herein refers to label including the RFID device that may be attached to any goods/objects to track and trace the goods/objects.

"Radiation pattern" as used herein refers to a visual representation of the radiation emission or reception of wave front at an antenna.

"First frequency" as used herein refers to a resonance frequency of the first resonator. Furthermore, the first frequency is a function of a capacitive reactance of the capacitor and a resistance of a sheet (as described herein below).

"Second frequency" as used herein refers to a resonance frequency of the second resonator. Furthermore, the second frequency is a function of impedance of chip and reactive inductance of a loop conductor (as described herein below).

"Threshold frequency" as used herein refers to a minimum frequency required for an RFID device to respond to an RF signal. Furthermore, when the RFID device is exposed to an external RF frequency, the RFID device resonates at the threshold frequency of the RFID device and performs impedance matching to respond to the external RF frequency.

"Perimeter" as used herein refers to the boundary of a closed plane sheet.

"Antenna" as used herein refers to a conductor configured for receiving electromagnetic radiation and converting the electromagnetic radiation into radio frequency electrical signals on the receiver's end. During transmission, the analogue radio frequency electric signals are converted by the antenna into electromagnetic radiation and spread in all directions in the surrounding medium (such as air).

These and other features, aspects, embodiments, and advantages of the present subject matter will be better understood with reference to the below stated description and appended claims. These definitions are provided to introduce a selection of concepts in a simplified form. These definitions are not intended to identify key features or essential features or key words of the claimed or disclosed subject matter, nor is it intended to be used to limit the scope of the claimed subject matter.

II. Wide-Band, Orientation-Insensitive RFID Tag

The RFID tags disclosed herein are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. may be made and may be desired for a specific application.

In the present disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

In some embodiments, the present subject matter relates to an RFID device that includes a first resonator and a second resonator. Both resonators are designed, constructed and configured in such a way that the RFID device utilises such resonators as an antenna to create a wide-band and orientation insensitive tag when exposed radio wave containing one or more frequencies.

In some embodiments, the first resonator includes a sheet of electrically conductive material defining an area covered by a perimeter. The first resonator further includes a slot defined by two opposing sides formed on the sheet and the slot extends from an open end of an edge of the perimeter of the sheet to a closed end stretching within an internal region of the sheet. Furthermore, the opposing sides as used herein forms a slit originating from the open end of the edge of the sheet and extends to the closed end of the slot formed by removal of the material of the sheet.

In some embodiments, a conductive member is positioned between the open end and the closed end of the slot according to one embodiment herein. The conductive member is contoured by the slot in the region between the open end and the closed end. In some embodiment one end of the conductive member is connected and/or integrated into the first resonator and is open on the other end and extends into the slot. The conductor is flanked by the one of the opposing sides of the slot at some part of the slot and also contoured by the first resonator. The construction thus formed operates as capacitor because this is akin to two conductors positioned side by side and separated by an insulator such as the slot.

In some embodiments, the second resonator includes a loop conductor coupled to an integrated circuit (chip) that is a RFID chip. The second resonator is contained within the closed end of the slot that assumes a shape appropriate to contain the loop conductor based on its shape and geometry and is spaced from the opposing sides by a gap according to an embodiment herein. In some embodiment the closed end of the slot is either circular or rectangular or oval or trapezoidal or elliptical or square or an irregular shape. In accordance with an embodiment, the first resonator and the second resonator are co-planar to each other. In one embodiment, the RFID device is formed on a substrate.

In some embodiments, the RFID devices described herein have two resonators that give a read capability that is good over a wide variety of orientations, and may be substantially orientation independent. Note that this description refers to the terms "RFID device" and "wide-band sloop (WSB) antenna" interchangeably.

Throughout the present subject matter, the RFID device herein refers to wireless identification devices used for tracing and tracking of objects (known in the art). The RFID device as used herein is purposefully designed and configured to achieve orientation insensitivity and wide bandwidth. The orientation insensitivity refers to readability of the RFID device used herein with all the directions possible and efficient reflection of Radio Frequency Signal back to the RFID readers when operated. For example, the RFID device is in an orientation angle such as "FACE-ON" when activated or in an orientation angle such as "EDGE-ON" to the RFID reader. Furthermore, the orientation insensitivity is achieved through generating signals in a circularly polarised radiation. Moreover, the circular polarisation is the resultant output signals of the first resonator and the second resonator, when activated from the RFID readers. As described in the present subject matter herein, the wide bandwidth refers to a configuration of the RFID device that enables functioning of the RFID device used herein at two distinct resonance frequencies and hence providing a wide bandwidth of operation. Notably, the wide bandwidth is achieved by the first resonator operating at a first frequency and the second resonator operating at a second frequency.

Figure 4:
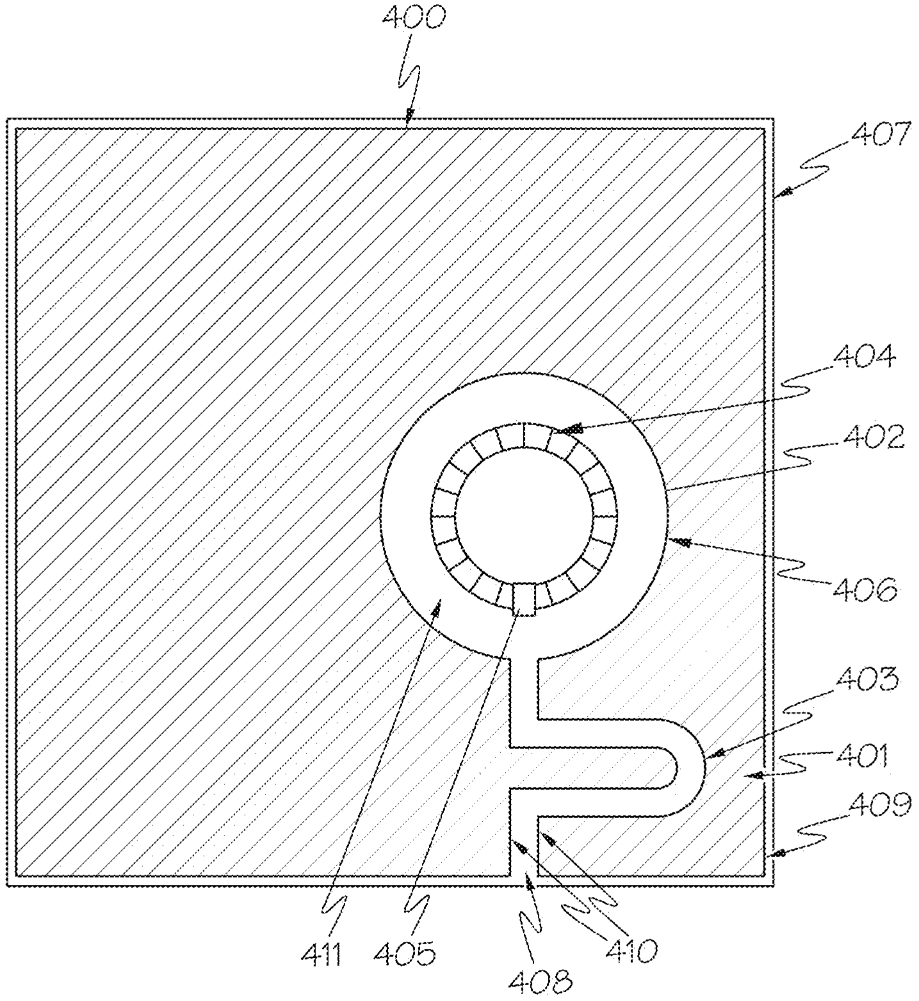
FIG. 4 illustrates a schematic illustration of RFID device, in accordance with various exemplary embodiment of the present subject matter.

The configuration shown in FIG. 4 illustrates a schematic illustration of an RFID device 400. The RFID device 400 for RFID tag that has both a wide-band dual response and an orientation insensitivity is described herein. An example of such an RFID device 400 is shown in FIG. 4. RFID tag containing such RFID device 400 is also described herein. The RFID device 400 includes a substrate 407 and an antenna structure having a first resonator 401, a second resonator 404. In some embodiments, the second resonator 404 is embedded and/or contained within the first resonator 401. Furthermore, the second resonator 404 is in the same plane with the first resonator 401. In an example, the first resonator 401 and the second resonator 404 may be manufactured of same material.

The first resonator 401 includes a sheet of electrically conductive material defining an area covered by a perimeter 409. The conductive material may include metal or any other electrically-conductive materials known in the art and may be selected for a particular antenna and/or intended application. The sheet of electrically conductive material contains a slot 402. The slot 402 defined by two opposing sides 410 and the slot 402 being extended from an open end 408 of an edge of the perimeter 409 of the sheet to a closed end 406 stretching within an internal region of the sheet. The sheet may also contain one or more notches and/or protrusions. For instance, notches are designed to prevent interference from larger electromagnetic signals. The slot 402 may be cut from the sheet of conductive material of the first resonator 401 at various locations such as shown in the FIG. 4. Furthermore, cutting may be accomplished via mechanical die cutting, etching, laser cutting or any other suitable means to cut and then remove the unwanted material. The slot 402 is a non-conductive portion of the first resonator 401. For instance, the slot 402 may be larger in dimensions with respect to the second resonator 404. This non-conductive portion may be air or any dielectric medium or insulator. The second resonator 404 is contained within the circular closed end 406 of the slot 402. Furthermore, the second resonator 404 may be manufactured using the same material of the sheet of the first resonator 401. In an example, the second resonator 404 may be constructed by die cutting the sheet to define the slot 402 and the second resonator 404. According to an embodiment, the second resonator 404 is co-planar to the sheet of the first resonator 401. The RFID device 400 includes a conductive member 403 is positioned between an open end 408 of the slot 402 and a circular closed end 406. For instance, the structure of the first resonator 401 includes a large proportion of surface area covered by the sheet. Thus, the length of the area between the slot 402 and the perimeter 409 of the sheet may be greater than width of the slot.

The second resonator 404 that is a loop conductor (502 as shown in FIG. 5) is coupled to an integrated circuit (chip) 405. The chip 405 typically is an RFID chip. The loop conductor in the second resonator 404 is electrically or inductively coupled to the chip 405. For example, in electrical coupling, the loop conductor of second resonator 404 and chip 405 may be connected using an electric connection such as a wire and the like. Further, in inductive coupling, the chip 405 and the loop conductor may be coupled via a magnetic field. The second resonator 404 is contained within the circular closed end 406 of the slot 402 and is spaced by a gap 411 from the opposing sides 410. The opposing sides 410 of the slot 402 starts at the open end 408 and extend gradually into the internal region of the sheet. The opposing sides 410 merge with each other at the closed end 406. The second resonator 404 is inductively or capacitively coupled to the first resonator 401. For example, in capacitive coupling, the loop conductor of second resonator 404 and chip 405 may be connected using a capacitor.

Further, the first resonator 401 is configured to operate at a first frequency. The second resonator 404 is configured to operate at second frequency. The conductive member is configured to tune the first resonator to resonate at the first frequency. The resonance of the first resonator 401 is a function (Fn) of a capacitive reactance of the capacitor (C1) and an area (A1) of the sheet. The resonant frequency of the first resonator 401 is shown in Equation 1.

$$F1 = Fn[C1 \cdot A1] \quad \text{[Equation 1]}$$

The second resonator 404 is configured to operate at a second frequency. The resonant response of the second resonator 404 is a function (Fn) of impedance of the chip (C2) and reactive inductance of the loop conductor (L1). The resonant frequency of the second resonator 404 is shown in Equation 2.

$$F2 = Fn[C2 \cdot L1] \quad \text{[Equation 2]}$$

In an embodiment, the loop conductor is configured to receive RF power from incoming electromagnetic wave transmitted from an RFID reader (no shown in Fig) via a feeding structure. Further, the loop conductor is configured to supply the received RF power to the chip 405. The loop conductor is also configured to radiate excited energy when RF power flows through the loop conductor. This exited energy is transferred from the loop conductor to the first resonator 401 because the first resonator 401 and the second resonator 404 are magnetically or capacitively coupled with each other. Further, transfer of the excited energy constitutes an asymmetric current flow in the first resonator 401.

Asymmetric surface current's concentration on the sheet surface constitutes the asymmetric current flow. The concentration of the asymmetric surface current depends on characteristics of the first resonator 401. For example, the characteristics of the first resonator 401 may include a size of the sheet, a shape of the sheet, an area of the sheet, and an operating frequency.

FIG. 4, illustrates a top view of the RFID device 400 having the first resonator 401 and the second resonator 404 formed on the substrate 407. The conductive layer or sheet of the first resonator 401 may be formed, deposited or adhered onto the substrate 407 by any of a variety of suitable methods. For example, the sheet may be a conductive ink, such as an ink containing metal particles, that is printed onto the substrate 407 in a suitable pattern. Alternatively, the sheet may be plated onto the substrate 407, such as by electroplating. As another alternative, the sheet may be adhesively adhered to the substrate 407. Etching may be used to remove conductive material to form the slot 402. Further, the second resonator 404 is placed on the substrate 407 and within the circular closed end of the slot 402. The second resonator 404 may be placed or adhered onto the substrate 407 using adhesive or any other suitable means by that to attach the second resonator 404 to the substrate 407. The substrate 407 may be any material known in the art and may be selected for a particular antenna and/or intended application. Examples include, but are not limited to, VY cardstock, poly(methylene) oxide (PMO), glass-reinforced epoxy laminate material (FR4), and carp.

Figure 5A:
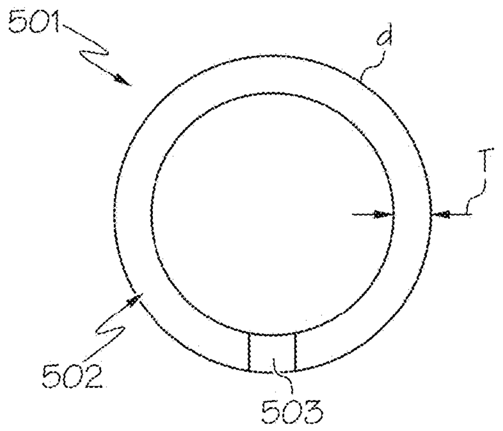
FIG. 5A illustrates a geometry of a second resonator having a loop conductor and a chip, in accordance with some embodiment of the present subject matter.

FIG. 5A illustrates a geometry of a second resonator 501 having a loop conductor 502 and a chip 503, in accordance with some embodiments of the present subject matter. The loop conductor 502 is inductively or electrically coupled to the chip 503. The shape of the loop conductor 502 of this embodiment is a circle. The geometry of the second resonator 501 antenna operating at second frequency is shown in Equation 3.

$$L1 = Fn[d \cdot T] \qquad \text{[Equation 3]}$$

The loop conductor 502 has a loop with diameter 'd', and thickness of the loop is 'T'. The inductance of the loop conductor 502 is a function of a loop diameter and a loop thickness. The loop conductor is connected to power feed terminals or the feeding structure (not shown in Fig) via connecting conductors (not shown in Fig). The power feed terminals to that the power feed circuit or coaxial cables are connected to feed the RF power to the first resonator 401 (as shown in FIG. 4) and the second resonator 404 or 501, received from the incoming RF signals. Further, the chip impedance is one of a function of a parallel capacitance (Cp), parallel inductance (Xr), parallel resistance (Rp), and combinations thereof.

Figure 5B:
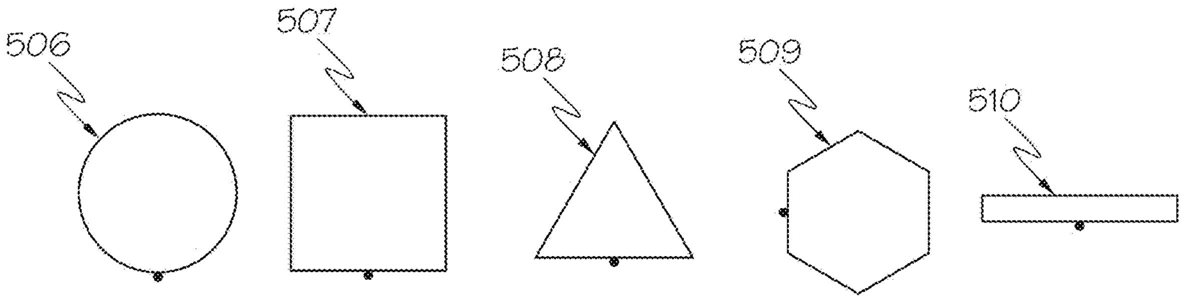
FIG. 5B illustrates a schematic illustration of various shapes of a second resonator, in accordance with various exemplary embodiment of the present subject matter.

FIG. 5B illustrates a schematic illustration of various shapes of the second resonator 501, in accordance with various exemplary embodiments of the present subject matter. The "second resonator" as used herein refers to a conductor and/or conductive element of an RFID antenna (the RFID antenna may include convention RFID tag antenna known in the art). The second resonator 501 comprises a loop conductor and an integrated chip or a chip that stores data. Furthermore, the loop conductor is one of shape of a circle 506, a square 507, a triangle 508, a hexagon 509, and a rectangle 510.

Figure 6A:
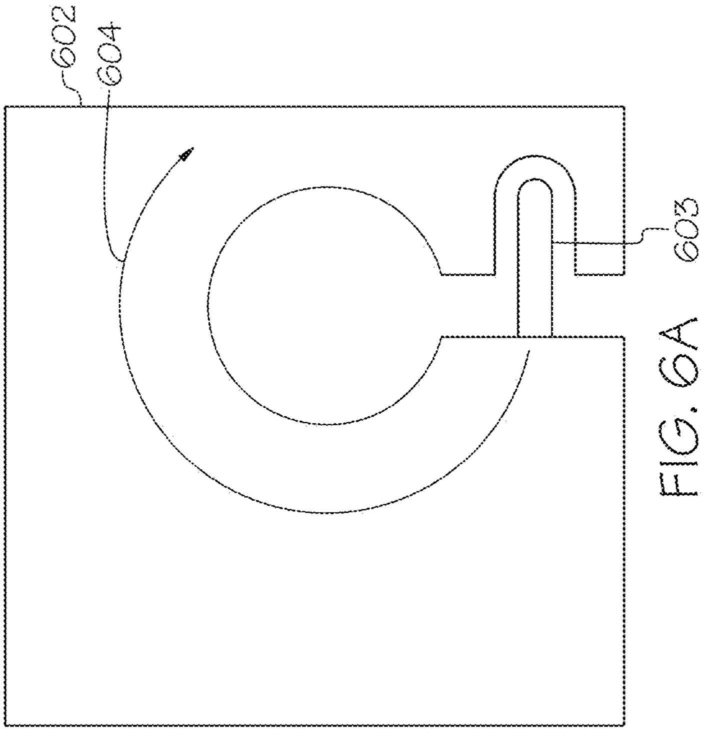
FIG. 6A illustrates a plan view of a first resonator with a conductive member, in accordance with some embodiment of the present subject matter.

FIG. 6A illustrates a plan view of a first resonator 602 with a conductive member 603, in accordance with some embodiments of the present subject matter. The first resonator 602 comprising a sheet of electrically conductive material 603 and defining an area covered by a perimeter (as shown in FIG. 4). The first resonator 602 is excited by the second resonator 404. Because of excitation current being distributed through the sheet. Current follows a path depicted as composite path 604. The path is a function of shape and dimension of the sheet.

Further, the slot defined by opposing sides 410 and the slot being extended from the open end of the edge of the perimeter of the sheet to the closed end stretching within the internal region of the sheet. The open end is connected to the circular closed end with the conductive member 603 such as a capacitor. The capacitor is configured provide a predetermined impedance by adjusting or tuning. Tuning is adjustment of capacitance value. For example, consider present impedance of the first resonator 602 is not matched with the predetermined impedance, then the conductive member 603 is configure to adjust the first resonator 602 impedance to predetermined impedance by adjusting capacitance value. For instance, capacitance value may be varied from 0.1 pF to 1 pF. The value of capacitance is only an example and should not be considered as a limitation.

Figure 6B:
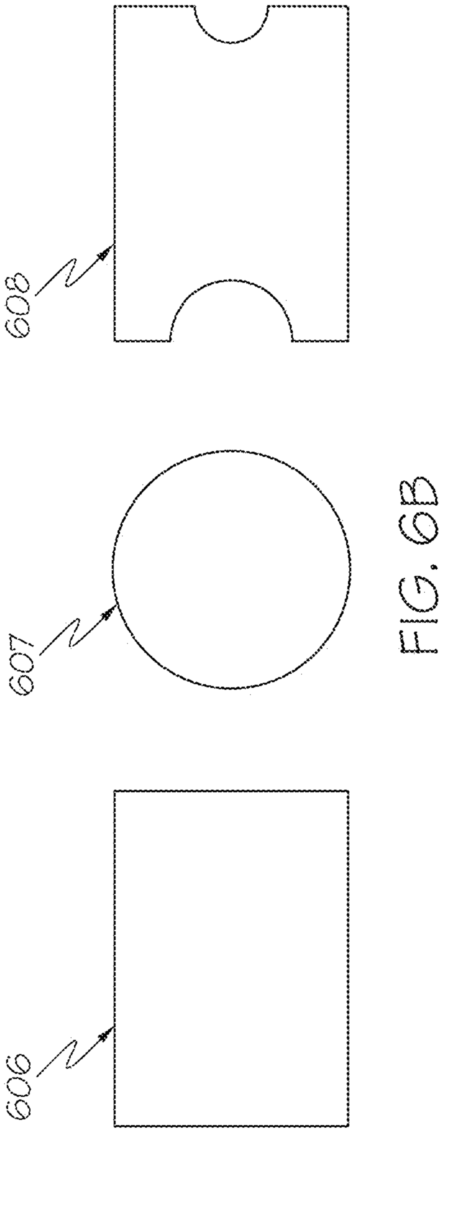
FIG. 6B illustrates a schematic illustration of various shapes of a first resonator, in accordance with various exemplary embodiment of the present subject matter.

FIG. 6B illustrates a schematic illustration of various shapes of the first resonator 602, in accordance with various exemplary embodiment of the present subject matter. The "first resonator" as used herein refers to a conductor and/or conductive element of an RFID antenna (the RFID antenna may include convention RFID tag antenna known in the art). The first resonator 602 comprises a slot defined by opposing sides (opposing sides 410 as shown in FIG. 4). The "slot" (slot 402 as shown FIG. 4) as used herein refers to a carved out are formed by removing the conductive material out of the first resonator 602. Furthermore, the slot herein facilitates accommodation of additional conductors and/or semiconductors therein to enable various electronic, electrical and/or electromagnetic properties that enhances the efficiency and functioning of the RFID device 400 (as shown in FIG. 4) as described herein. Furthermore, the first resonator 602 may include a shape of the sheet is one of a rectangle 606, a circle 607, a parallelogram with semi-circular cuts 608, and. In an embodiment, the first resonator 602 may include an irregular shape and/or a regular parallelogram.

Figure 7:
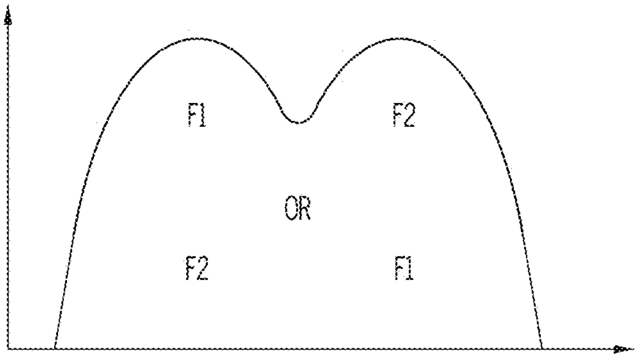
FIG. 7 illustrates a graph showing a composite frequency response of an RFID device having a first resonator and a second resonator, in accordance with some embodiment of the present subject matter.

FIG. 7 illustrates a graph showing the composite frequency response of the RFID device 400 (as shown in FIG. 4) having the first resonator 401 (as shown in FIG. 4) and the second resonator 404 (as shown in FIG. 4), in accordance with some embodiment of the present subject matter. As previously discussed, the RFID device 400 has two antenna configurations such as first resonator 401 and the second resonator 404. The first resonator 401 and second resonator 404 may be configured to communicate at different frequencies such as the first frequency (f1) and the second frequency (f2), enabling the RFID device 400 to effectively communicative at both frequencies. Therefore, providing the RFID device 400 with the capability of communicating at both f1 and f2 is advantageous so that the RFID device 400 may be used for applications in both the United States and abroad. The RFID device 400 is sensitive to two frequencies such as f1 and f2. Specific frequency f1 or f2 resonates when the RFID device 400 receives electromagnetic waves from the reader/writer having a frequency f1 or f2. For instance, consider the RFID device 400 is interrogated by an interrogation reader having a frequency of f1 for communication purposes. The first resonator 401 is suitable for f1, then the first resonator 401 resonates at f1 and the capacitor is configured to tune the impedance of the first resonator 401 accordingly to achieve required impedance. In another instance, consider the RFID device 400 is interrogated by an interrogation reader having a frequency of f2 for communication purposes. The second resonator 404 is suitable for f2, then the second resonator 404 resonates at f2 and the RFID chip is configured to tune the impedance of the second resonator 404 accordingly to achieve required impedance.

Figure 8:
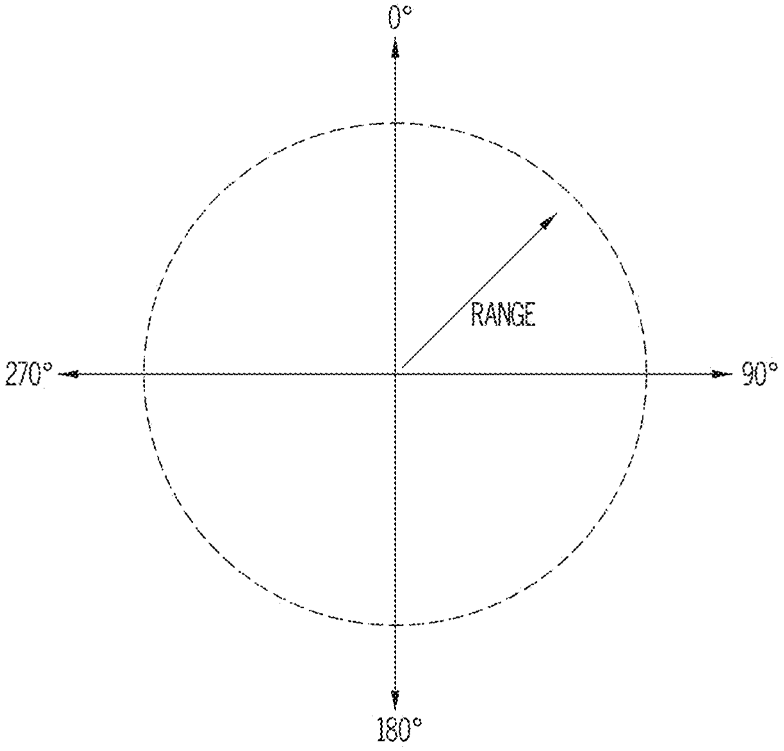
FIG. 8 illustrates the radiation pattern of the RFID device 400, in accordance with various exemplary embodiment of the present subject matter.

FIG. 8 illustrates the radiation pattern of the RFID device 400 (as shown in FIG. 4), in accordance with various exemplary embodiment of the present subject matter. Referring back to FIG. 4, current distribution in the two resonators such as the first resonator 401 (as shown in FIG. 4) and the second resonator 404 (as shown in FIG. 4) excites circular polarized radiation pattern or elliptical polarized radiation pattern. The radiation pattern is dependent on design of the two resonator elements and how the elements are coupled together. The antenna structure having two resonators 401 and 404 gives a read capability that is good over a wide variety of orientations, and may be substantially orientation independent. For instance, consider present coupling arrangement and design of two resonators 401 and 404 of the RFID device 400 configured to produce circular polarization radiation by generating two perpendicular electric fields ($E_{HOR}$ (horizontal), $E_{VER}$ (vertical)) with the equal amplitude that differ in phase by 90°. In another instance, consider present coupling arrangement and design of two resonators 401 and 404 of the RFID device 400 configured to produce elliptical polarized radiation pattern by generating two perpendicular electric fields ($E_{HOR}$ (horizontal), $E_{VER}$ (vertical)) of unequal amplitude that differ in phase by 90°.

Figure 9A:
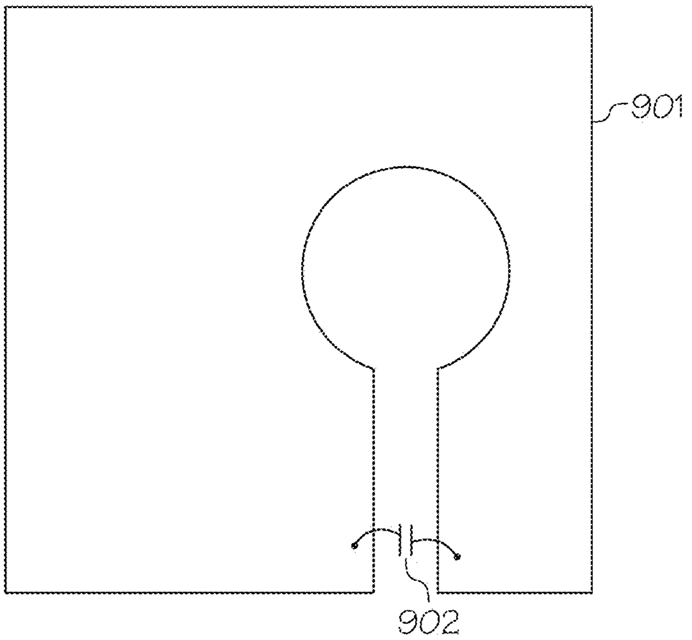
FIG. 9A illustrates a schematic illustration of a first resonator, in accordance with an exemplary embodiment of the present subject matter.

FIG. 9A illustrates a schematic illustration of a first resonator 901, in accordance with an exemplary embodiment of the present subject matter. The first resonator 901 comprises a parallel plate capacitor 902.

Figure 9B:
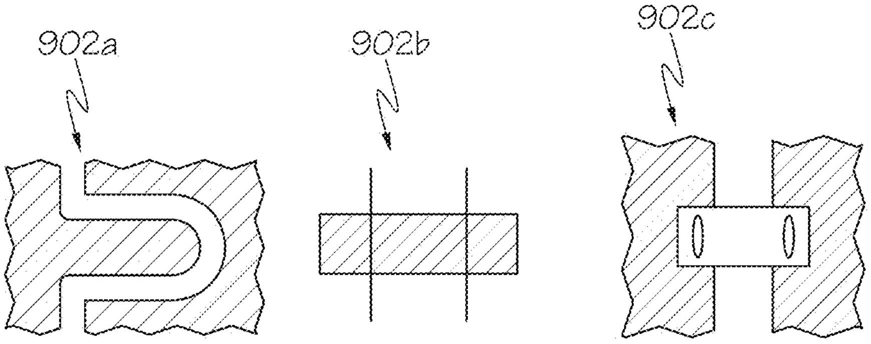
FIG. 9B illustrates a schematic illustration of various capacitors to be accommodated within a first resonator, in accordance with various exemplary embodiment of the present subject matter.

FIG. 9B illustrates a schematic illustration of various capacitors to be accommodated within the first resonator 901, in accordance with various exemplary embodiment of the present subject matter. The various capacitors include an inter-digital capacitor 902*a*, a parallel plate capacitor 902*b* using a top conductor separated by a dielectric overlapping the gap, and a ceramic capacitor 902*c* made with ceramic and/or other suitable material that may be added using a conductive connection.

Figure 10:
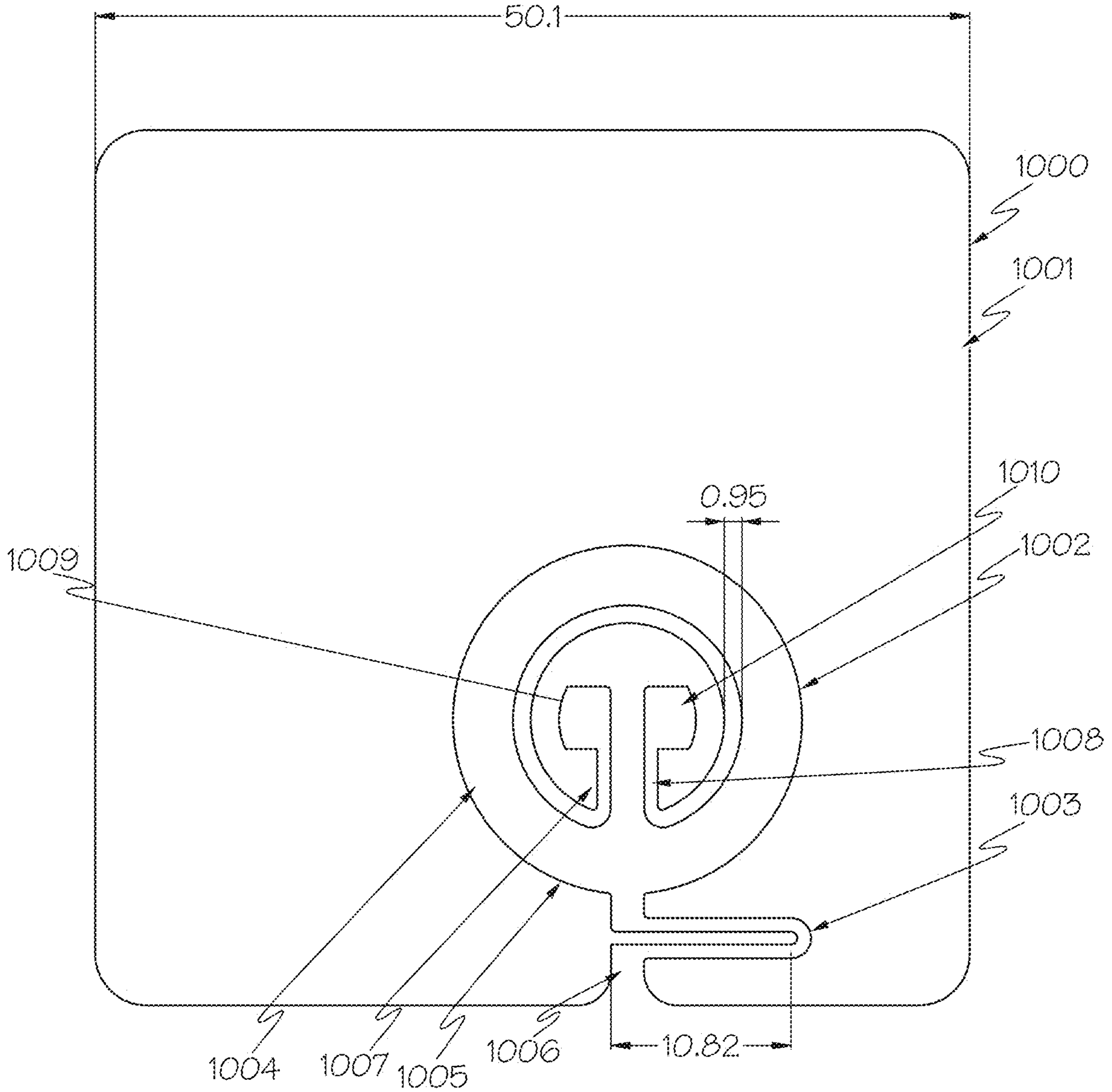
FIG. 10 is another illustration of an exemplary RFID device, in accordance with an exemplary embodiment of the present subject matter.

FIG. 10 is another illustration of an exemplary RFID device 1000, in accordance with an exemplary embodiment of the present subject matter. The RFID device 1000 includes a substrate (not shown in fig) and an antenna structure having a first resonator 1001, a second resonator 1002. The first resonator 1001 comprising a sheet of electrically conductive material and defining an area covered by the perimeter (as shown in FIG. 4). The conductive material may include metal or any other electrically-conductive materials known in the art and may be selected for a particular antenna and/or intended application. The sheet of electrically conductive material that contains a slot 1004. The slot 1004 defined by opposing sides (as shown in FIG. 4) and the slot 1004 being extended from an open end 1006 of an edge of the perimeter of the sheet to a closed end 1005 stretching within an internal region of the sheet. The slot 1006 may be cut from the sheet of conductive material of the first resonator 1001 at various locations such as shown in the FIG. 10. Cutting may be accomplished via mechanical die cutting, laser cutting or any other suitable means to cut and then remove the unwanted material. The slot 1004 is a non-conductive portion of the first resonator 1001. This non-conductive portion may be air. The open end 1006 of the slot 1004 is connected to the circular closed end 1005 with a conductive member 1003.

The second resonator 1002 comprising a loop conductor (as shown in FIG. 5A) coupled to an integrated circuit (chip) (as shown in FIG. 5A). The loop conductor in the second resonator 1002 is electrically or inductively coupled to the RFID chip. The second resonator 1002 is contained within the circular closed end 1005 of the slot 1004 and is spaced by a gap (as shown in FIG. 4) from the opposing sides. The opposing sides of the slot 1004 starts at the open end 1006 and extend gradually into the internal region of the sheet. The opposing sides merge with each other at the closed end 1005. The second resonator 1002 is inductively or capacitively coupled to the first resonator 1001. The loop conductor is connected to power feed terminals (1009, 1010) or the feeding structure via connecting conductors (1007, 1008). The power feed terminals (1009, 1010) to that the power feed circuit (not shown in Fig) or coaxial cables (not shown in Fig) are connected to feed the RF power to the second resonator 1002, received from the incoming RF signals. Further the RF power is induced to the first resonator 1001 by means of coupling. For example, the RFID device 1000 of the configuration shown in FIG. 10, having outer dimensions of 50.1 mm×50.1 mm, loop conductor has 0.95 mm thickness and conductive member 1003 having 10.82 mm length.

Figure 11:
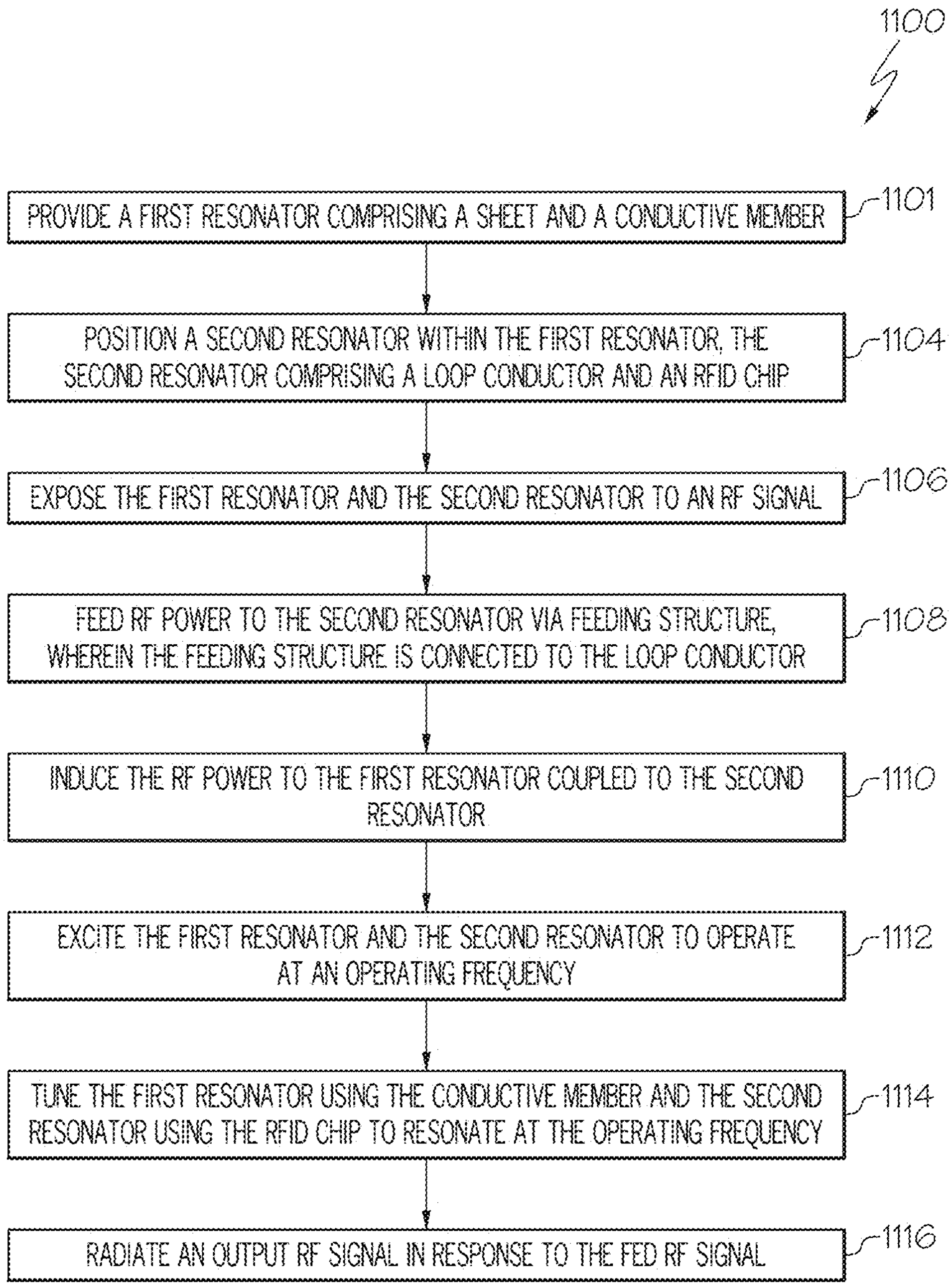
FIG. 11 shows a flowchart depicting a process for operating an RFID device, in accordance with an exemplary embodiment of the present subject matter.

FIG. 11 illustrates a flowchart depicting a method for operating an RFID device, in accordance with an exemplary embodiment of the present subject matter. The method steps 1101 to 1116 explained below herein with respect to the FIG. 4 and FIG. 10. It may be appreciated that the method steps 1101 to 1116 are referred and aligned in lines of the embodiments of the present subject matter explained herein above as described in the FIG. 4 and FIG. 10. The steps illustrated herein are for understanding and explanation, may not be limited with the context of the method steps. Furthermore, the method steps as sequenced herein may vary and alter with scenarios, circumstances and situations. Furthermore, the accommodation of required steps, within the scope of the present subject matter, may be performed based on requirements.

At step 1101, now referring to FIG. 4 (as mentioned herein above), the first resonator 401 comprising the sheet and the conductive member 403 is provided. For instance, consider the sheet having the perimeter 409 of square shape. The slot 402 (as shown in FIG. 4) is created within the sheet by means of cutting. The cutting may be accomplished via mechanical die cutting, etching, laser cutting or any other suitable means to cut and then remove the unwanted material. Alternatively, the sheet may be plated onto the substrate 407, such as by electroplating. As another alternative, the sheet may be adhesively adhered/attached to the substrate 407. In an embodiment, etching may be used to remove conductive material to form the slot 402. The slot 402 is defined by opposing sides 410 and the slot 402 being extended from the open end 408 of an edge of the perimeter 409 of the sheet to a closed end 406 stretching within the internal region of the sheet. The conductive member is placed between the open end 408 and the closed end 406 and is contoured by the slot 402 in between. The first resonator 401 and the second resonator 404 are formed on the substrate 407.

At step 1104, referring to FIG. 4 (as mentioned herein above), the second resonator 404 is positioned within the first resonator 401. The second resonator 404 comprising the loop conductor (as shown in FIG. 5A) and the RFID chip 405. The second resonator 404 is positioned by placing the second resonator 404 within the closed end of the slot 402 and leaving the gap 411 between the first resonator 401 and the second resonator 404.

At step 1106, referring back to FIG. 4 (as mentioned herein above), the RFID device 400 including the first resonator 401 and the second resonator 404 is exposed to a Radio Frequency (RF) signals (not shown in Fig). The exposing comprises interrogating the RFID device 400 via an interrogator (not shown in Fig). The interrogation includes transmission of an interrogation signal to retrieve data from the RFID device through RFID chip 405. For example, the interrogator may be an RFID reader, and the like. In another example, the interrogation may include attempting a detection of the RFID device through the RFID reader to achieve and/or obtain a communication between the RFID device and the RFID reader for transmission of information through signal transmission.

At step 1108 and 1110, referring to FIG. 4 and FIG. 10 (as mentioned herein above), RF power received from the transmitted interrogation signal is fed to the second resonator 404 or 1001 via the feeding structure. The second resonator 1002 is inductively or capacitively coupled to the first resonator 1001. The loop conductor is connected to power feed terminals (1009, 1010) or the feeding structure via connecting conductors (1007, 1008). The power feed terminals to that the power feed circuit (not shown in Fig) or coaxial cables (not shown Fig) are connected to feed the RF power to the second resonator 1002, received from the incoming RF signals. Further the RF power is induced to the first resonator 1001 by means of coupling (inductively or capacitively). The power feed terminals (1009, 1010) to that the power feed circuit (not shown in Fig) or coaxial cables (not shown Fig) are connected to feed the RF power to the first resonator 1001.

At step 1112, RF power distribution in the first resonator 401 and the second resonator 404 constitutes an excitation of the first resonator 401 and the second resonator 404 resulting in current flow in the first resonator 401 and the second resonator 404.

At step 1114, referring to FIG. 4 (as mentioned herein above), the first resonator 401 is tuned or impedance matching using the conductive member 403 and the second resonator 404 tuned using the RFID chip 405 to resonate at the operating frequency. Furthermore, the operating frequency is a composite frequency of the RFID device 400. The operating frequency comprises a first frequency or a second frequency. In an embodiment, the impedance matching is performed for the first resonator with the capacitive reactance of the conductive member to operate at the operating frequency. In another embodiment, the impedance matching is performed for the second resonator 404 with the RFID chip 405 to operate at the operating frequency.

In an example scenario, consider the RFID device 400 includes a determining circuit (not shown in Fig) is configured detect frequency of electromagnetic waves received by the second resonator 404. The RFID device 400 is configured to match the impedance in accordance with information from the frequency determining circuit. As the impedance matching means, capacitance of the capacitor, RFID chip 405 impedance, and inductance of the loop conductor (as shown in FIG. 5A) may be used. The determining circuit may include a comparator and is configured to compare the frequency of incoming electromagnetic waves with the threshold frequency of the RFID device 400. Based on the comparison, the impedance matching is performed. For instance, the comparison provides a result that is a difference between incoming frequency of the electromagnetic waves with the threshold frequency of the RFID device 400.

At step 1116, an output RF signal is radiated in response to the fed RF signal from the RFID device (as shown in FIG. 4). In one embodiment, the RFID device 400 is configured to radiate the RF signal back to the RFID reader. This ensures the most efficient energy transfer between the antennas (i.e., the first resonator 401 and the second resonator 404) the RFID chip 405.

The performance of exemplary wide-band sloop (WSB) antenna is illustrated in the examples below. As shown in the examples, the WBS tag tends to outperform a dual dipole tag, AD681, on difficult dielectrics. On low dielectric materials, modified tuning, to drop the response down in frequency may provide better performance. Performance for the WBS is typically better edge on rather than face on, and the sloop is polarization sensitive face on unlike the AD681.

Typically, in addition to conductive materials, the RFID devices are also used with many other substrates. Each substrate has its own dielectric characteristics that typically affect the impedance matching between the chip and its antenna. Impedance matching ensures the most efficient energy transfer between an antenna and the chip. The RFID device may be used with a variety of different substrates to obtain optimal impedance matching. Such few examples are explained below in detail.

EXAMPLES

Figure 12:
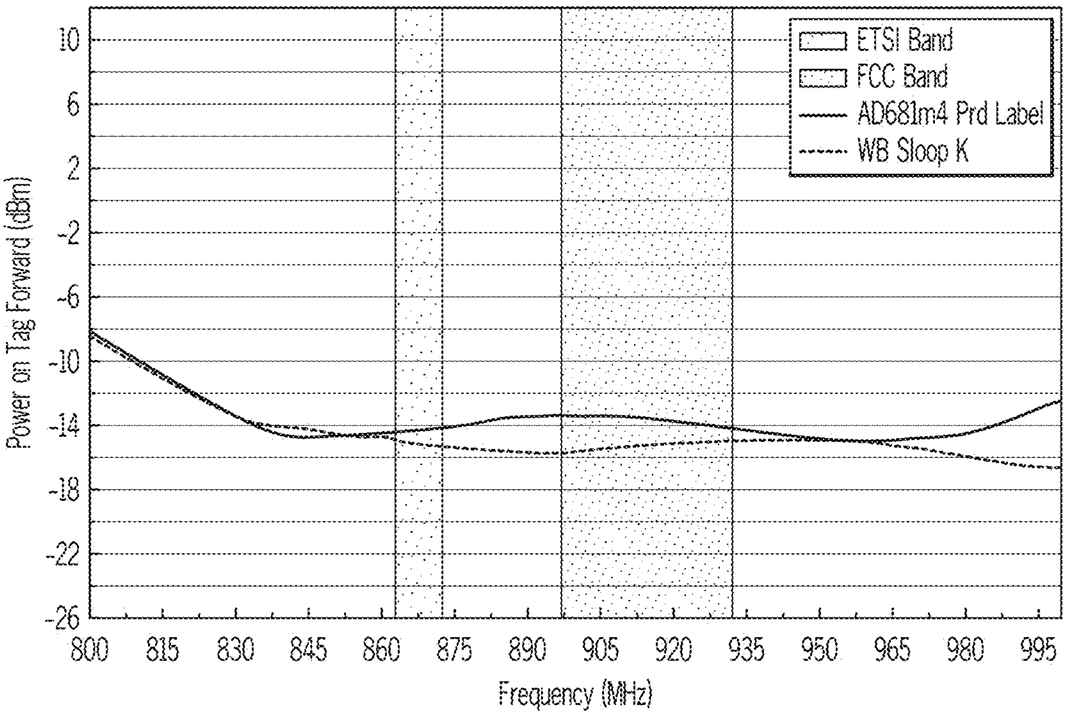
FIG. 12 is a graph comparing the power on tag forward (dBm) as a function of frequency for an exemplary WBS tag (dotted line) and a dual diploe tag (solid line), AD681, edge-on on cardboard.

Example 1. Evaluation of a Wide-Band, Orientation Insensitive Sloop (WBS) Tag Edge-on on Cardboard The performance of an exemplary WBS tag was evaluated edge-on on cardboard. The results are shown in FIG. 12. The WBS tag performed better than the AD681 tag, a dual dipole design.

Figure 13:
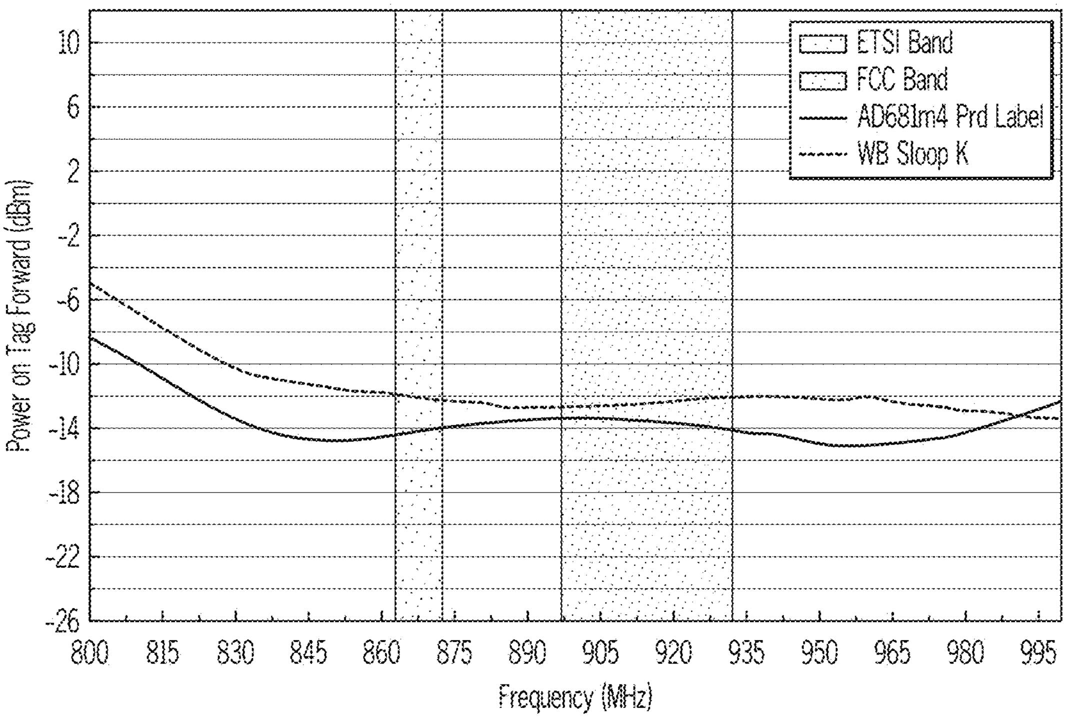
FIG. 13 is a graph comparing the power on tag forward (dBm) as a function of frequency for an exemplary WBS tag (dotted line) and a dual diploe tag (solid line), AD681, face-on on cardboard.

Example 2. Evaluation of a Wide-Band, Orientation Insensitive Sloop (WBS) Tag Face-on on Cardboard The performance of an exemplary WBS tag was evaluated face-on on cardboard. The results are shown in FIG. 13. The WBS tag performed better than the AD681 tag. For face-on applications, a shift down in frequency on the WBS would likely provide a better balance.

Example 3. Evaluation of a Wide-Band, Orientation Insensitive Sloop (WBS) Tag Edge-on on Poly(Methylene) Oxide (POM)

Figure 14:
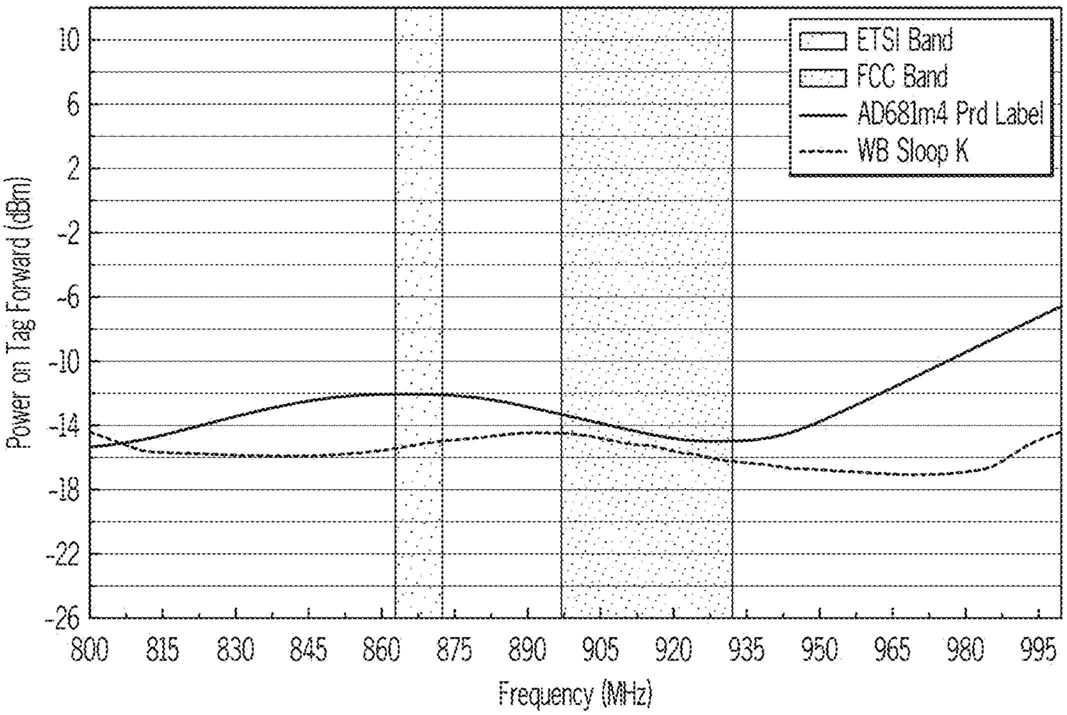
FIG. 14 is a graph comparing the power on tag forward (dBm) as a function of frequency for an exemplary WBS tag (dotted line) and a dual diploe tag (solid line), AD681, edge-on on poly(methylene) oxide (POM)

The performance of an exemplary WBS tag was evaluated edge-on on poly(methylene) oxide (POM). The results are shown in FIG. 14. The WBS tag performed better than the AD681 tag.

Example 4. Evaluation of a Wide-Band, Orientation Insensitive Sloop (WBS) Tag Face-on on Poly(Methylene) Oxide (POM)

Figure 15:
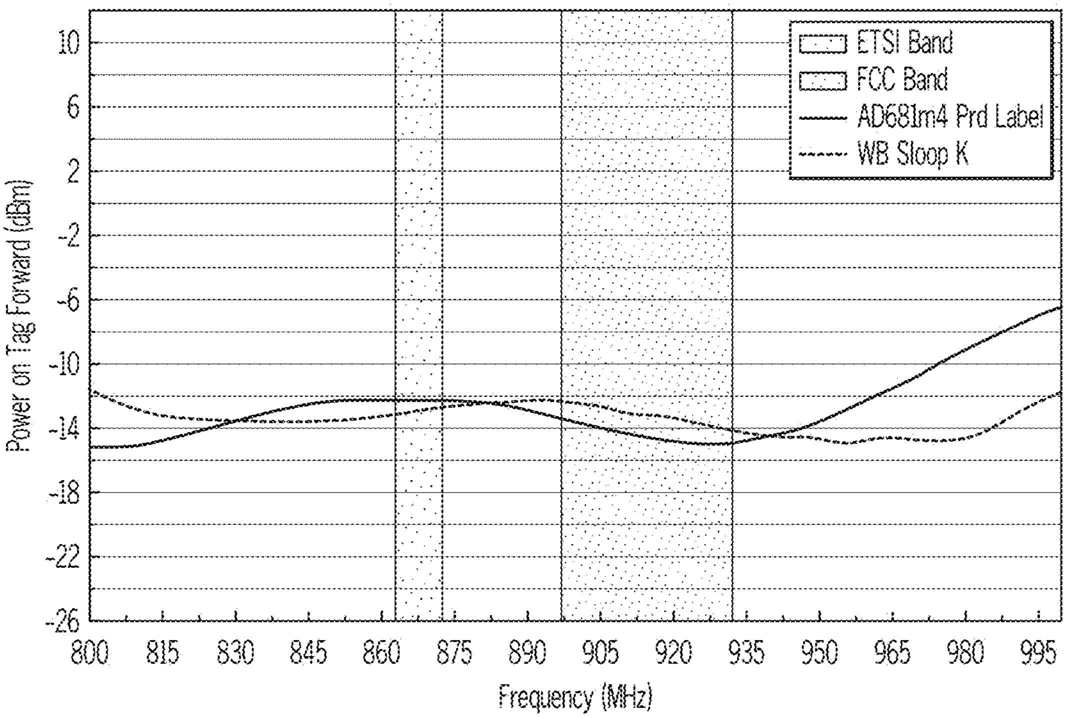
FIG. 15 is a graph comparing the power on tag forward (dBm) as a function of frequency for an exemplary WBS tag (dotted line) and a dual diploe tag (solid line), AD681, face-on on poly(methylene) oxide (POM)

The performance of an exemplary WBS tag was evaluated face-on on poly(methylene) oxide (POM). The results are shown in FIG. 15. The WBS tag and AD681 exhibited similar performance.

Example 5. Evaluation of a Wide-Band, Orientation Insensitive Sloop (WBS) Tag Edge-on on Glass-Reinforced Epoxy Laminate Material (FR4)

Figure 16:
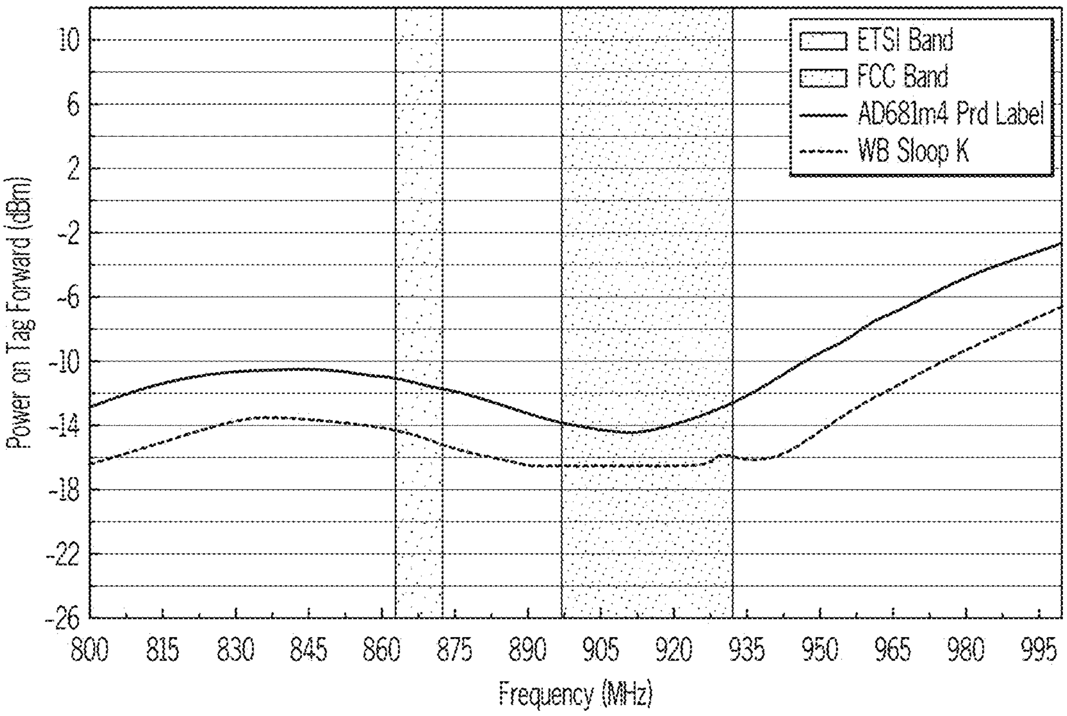
FIG. 16 is a graph comparing the power on tag forward (dBm) as a function of frequency for an exemplary WBS tag (dotted line) and a dual diploe tag (solid line), AD681, edge-on on FR4.

The performance of an exemplary WBS tag was evaluated edge-on on glass-reinforced epoxy laminate material (FR4), a high gloss material. The results are shown in FIG. 16. The WBS tag performed better than the AD681 tag.

Example 6. Evaluation of a Wide-Band, Orientation Insensitive Sloop (WBS) Tag Face-on on Glass-Reinforced Epoxy Laminate Material (FR4)

Figure 17:
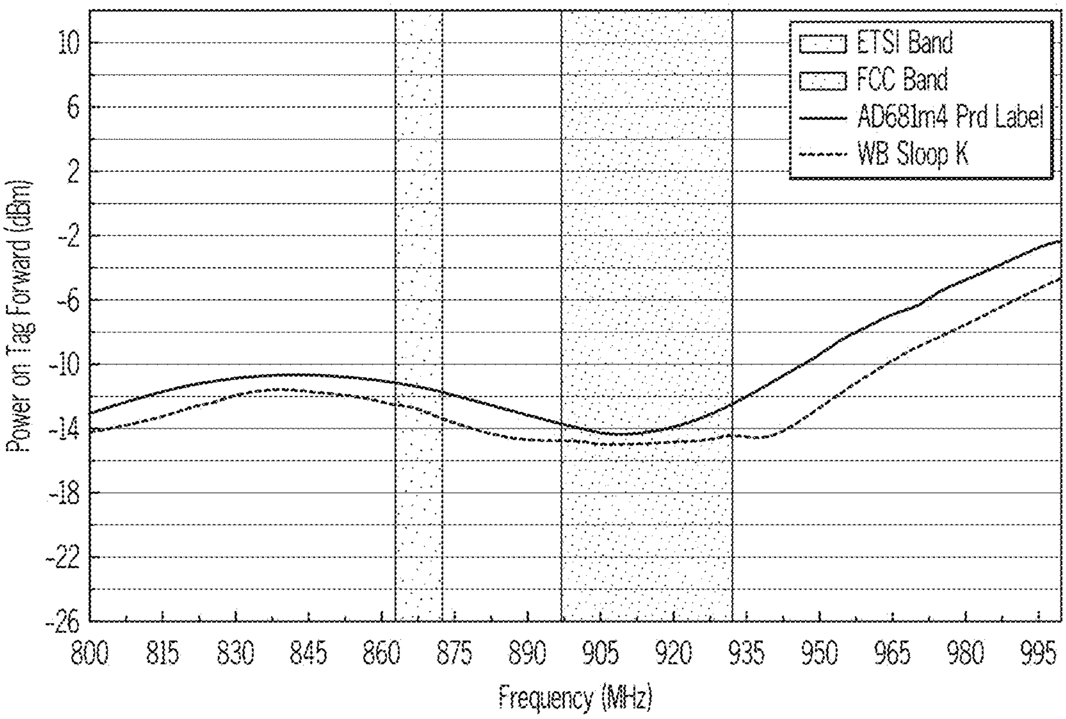
FIG. 17 is a graph comparing the power on tag forward (dBm) as a function of frequency for an exemplary WBS tag (dotted line) and a dual diploe tag (solid line), AD681, face-on on FR4.

The performance of an exemplary WBS tag was evaluated face-on on glass-reinforced epoxy laminate material (FR4), a high gloss material. The results are shown in FIG. 17. The WBS tag and AD681 exhibited similar performance.

Figure 18:
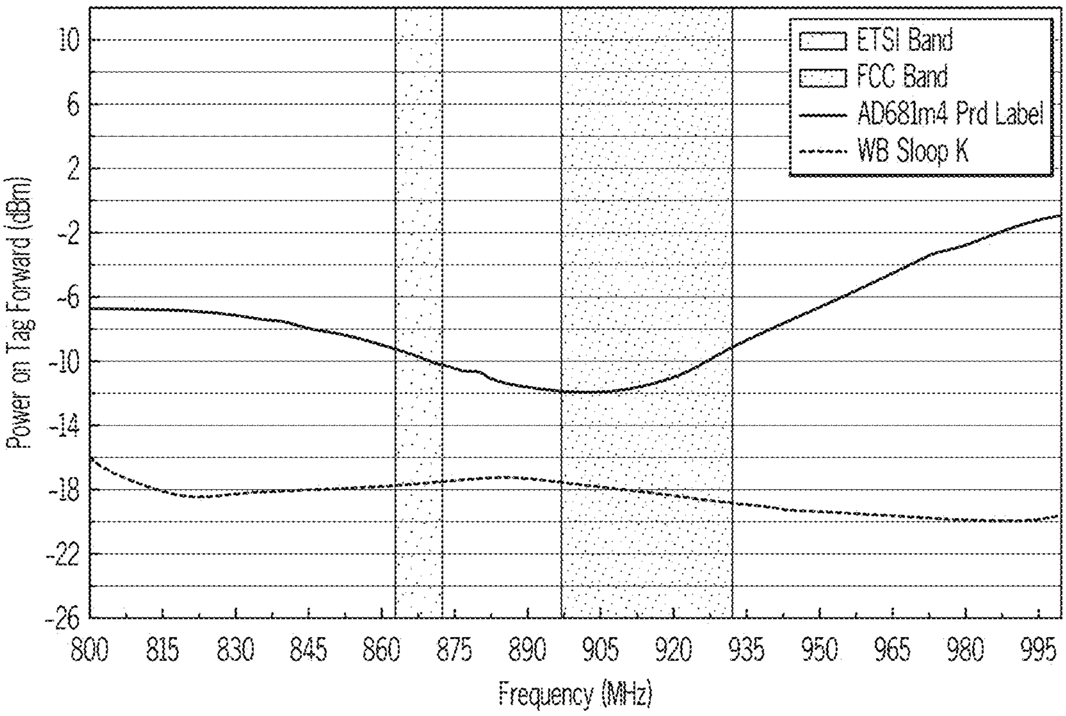
FIG. 18 is a graph comparing the power on tag forward (dBm) as a function of frequency for an exemplary WBS tag (dotted line) and a dual diploe tag (solid line), AD681, edge-on on Carp.

Example 7. Evaluation of a Wide-Band, Orientation Insensitive Sloop (WBS) Tag Edge-on on Carp The performance of an exemplary WBS tag was evaluated edge-on on Carp. The results are shown in FIG. 18. The WBS tag performed better than the AD681 tag.

Figure 19:
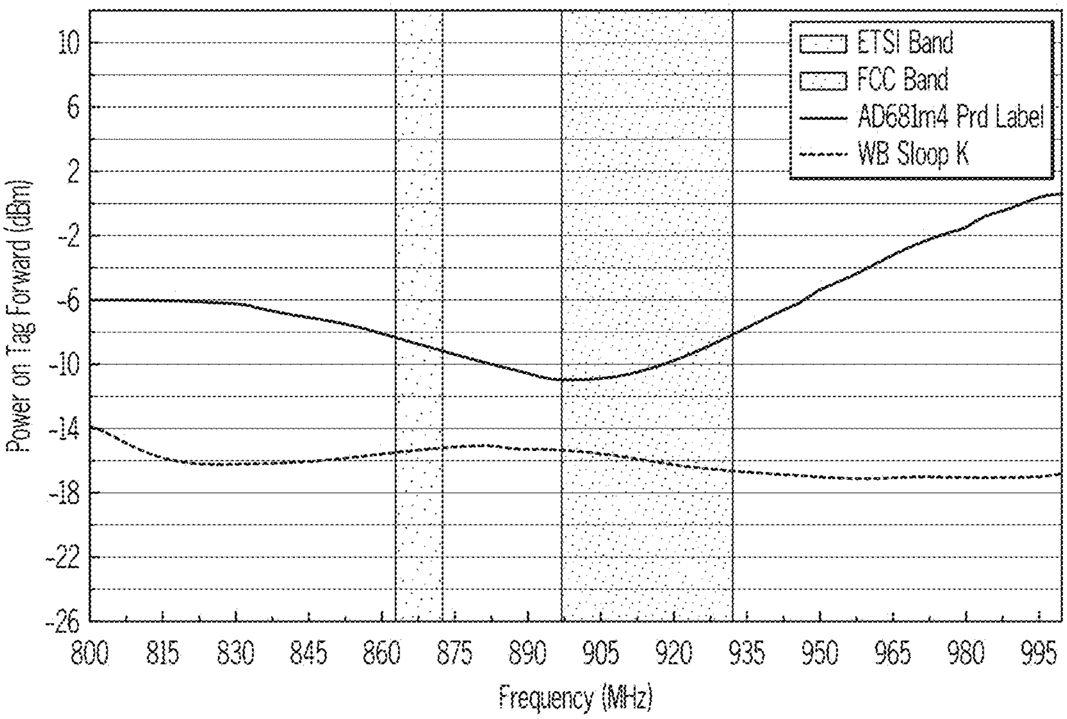
FIG. 19 is a graph comparing the power on tag forward (dBm) as a function of frequency for an exemplary WBS tag (dotted line) and a dual diploe tag (solid line), AD681, face-on on Carp.

Example 8. Evaluation of a Wide-Band, Orientation Insensitive Sloop (WBS) Tag Face-on Carp The performance of an exemplary WBS tag was evaluated face-on on Carp. The results are shown in FIG. 19. The WBS tag performed better than the AD681 tag.

Example 9. Comparison of Edge-on Radiation Patterns for WSB and AD681

Figure 20:
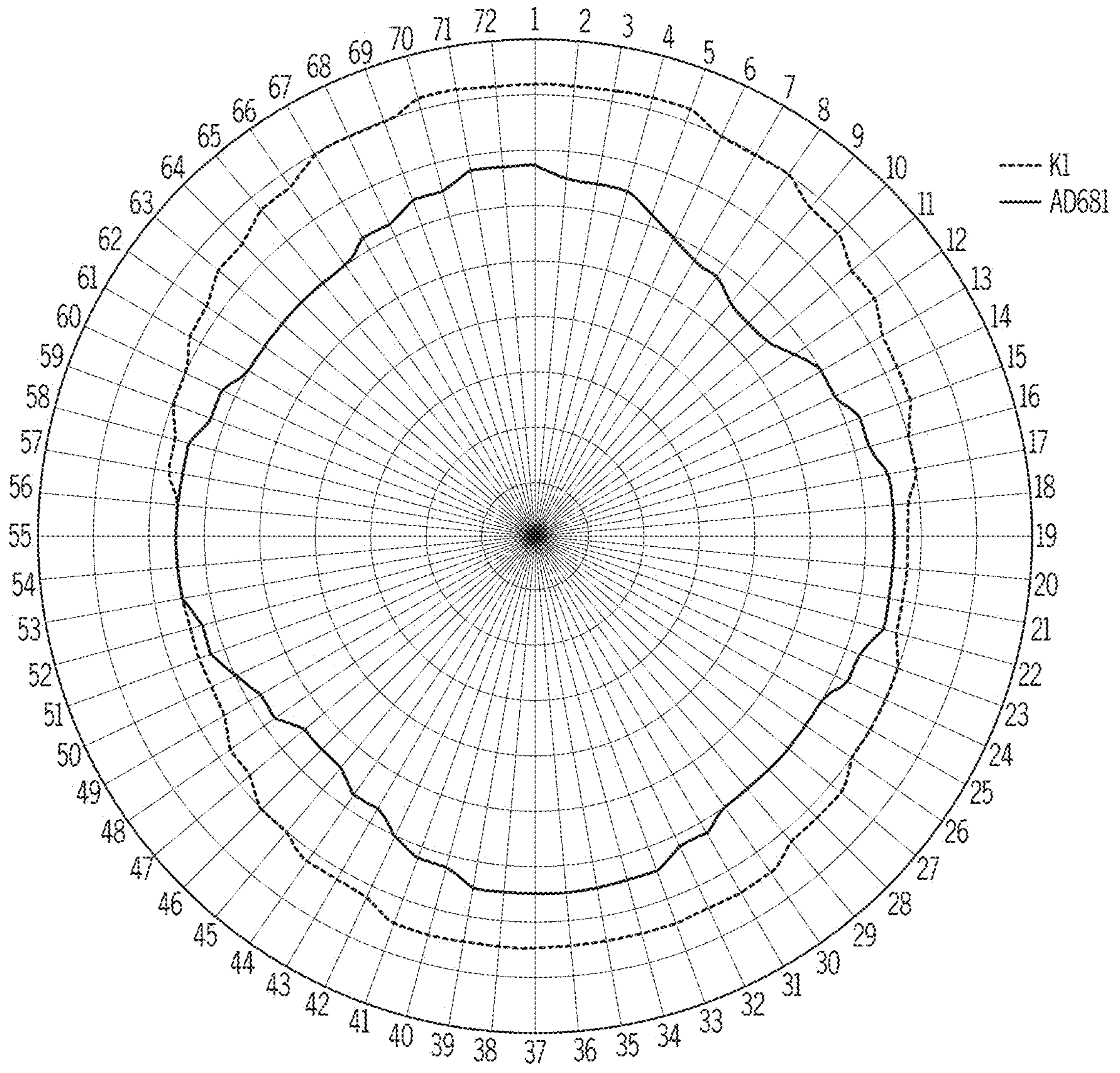
FIG. 20 is a graph showing the radiation pattern of an exemplary WBS tag (dotted line) and AD681 (solid line) on cardstock at 915 MHz.

The radiation patterns, edge-on, for an exemplary WSB and AD 681 were measured and compared. The results are shown in FIG. 20. On cardstock at a particular frequency, the absolute radiation pattern for the WBS K1 exceeds the performance of an AD681 at all angles. When normalized, the peak to null for the WBS K1 and AD 681 are similar, ~3.5 dB and ~2.5 dB, respectively.

Modifications to embodiments of the present subject matter described in the foregoing are possible without departing from the scope of the present subject matter as defined by the accompanying claims. Expressions such as “including”, “comprising”, “incorporating”, “have”, “is” used to describe and claim the present subject matter are intended to be construed in a non-exclusive manner, namely allowing for items, components or elements not explicitly described also to be present. Reference to the singular is also to be construed to relate to the plural.

What is claimed is:

1. An RFID device comprising:

a first resonator comprising a sheet of electrically conductive material and defining an area covered by a perimeter;

a slot defined by opposing sides and the slot being extended from an open end of an edge of the perimeter of the sheet to a closed end stretching within an internal region of the sheet, wherein a conductive member is placed between the open end and the closed end and is contoured by the slot in between; and a second resonator comprising a loop conductor coupled to an integrated circuit (chip), wherein the second resonator is contained within the closed end of the slot and is spaced by a gap from the opposing sides, wherein the second resonator is placed within the first resonator, leaving the gap between the first resonator and the second resonator.

2. The device of claim 1, wherein the first resonator and the second resonator are formed on a substrate, wherein the first resonator and the second resonator are co-planar to each other.

3. The device of claim 1, wherein the first resonator is configured to operate at a first frequency.

4. The device of claim 3, wherein the conductive member is configured to tune the first resonator to resonate at the first frequency.

5. The device of claim 1, wherein the conductive member is a capacitor.

6. The device of claim 5, wherein the resonance of the first resonator is a function of a capacitive reactance of the capacitor and a resistance of the sheet.

7. The device of claim 5, wherein the first resonator resonates when asymmetric current follows a path, wherein the path is a function of a shape and dimension of the sheet.

8. The device of claim 7, wherein the capacitor is selected from the group consisting of an inter-digital capacitor, a parallel plate capacitor, and a material comprising a conductive connection.

9. The device of claim 7, wherein the capacitor is an inter-digital capacitor.

10. The device of claim 1, wherein the closed end of the slot is a circular closed end.

11. The device of claim 1, wherein a shape of the sheet is one of a square, rectangle, circle, triangle and an irregular shape.

12. The device of claim 1, wherein the conductive member extends around the open end and is contoured by the slot.

13. The device of claim 1, wherein the second resonator comprises a feeding structure configured to receive an incoming RF signal.

14. The device of claim 13, wherein the feeding structure is configured to feed RF power to the first and second resonators, received from the incoming RF signal.

15. The device of claim 14, wherein the first and second resonators are triggered with fed RF power to produce a radiation pattern.

16. The device of claim 15, wherein the radiation pattern is circularly polarized.

17. The device of claim 15, wherein the radiation pattern is elliptically polarized.

18. The device of claim 1, wherein the second resonator is inductively coupled to the first resonator.

19. The device of claim 1, wherein the second resonator is capacitively coupled to the first resonator.

20. The device of claim 1, wherein the second resonator is configured to operate at a second frequency.

21. The device of claim 20, wherein the second resonator is tuned with the chip to resonate at the second frequency.

22. The device of claim 21, wherein a resonant response of the second resonator is a function of impedance of the chip and reactive inductance of the loop conductor.

23. The device of claim 22, wherein the impedance of the chip is one of a function of a parallel capacitance (Cp), parallel inductance (Xr), parallel resistance (Rp), and combinations thereof.

24. The device of claim 1, wherein a shape of the loop conductor is one of a circular, elliptical, square, rectangular, and triangular.

25. The device of claim 1, wherein the loop conductor in the second resonator is electrically or inductively coupled to the chip.

26. The device of claim 1, wherein the closed end of the slot is larger than the second resonator.

27. The device of claim 1, wherein the chip is an RFID chip.

28. The device of claim 1, wherein the opposing sides of the slot starts at the open end and extend gradually into the internal region of the sheet.

29. The device of claim 1, wherein the opposing sides merge with each other at the closed end.

30. A method for operating an RFID device, the method comprising:

providing a first resonator comprising a sheet and a conductive member;

positioning a second resonator within the first resonator, the second resonator comprising a loop conductor and an RFID chip, wherein positioning the second resonator comprises placing the second resonator within the first resonator, leaving a gap between the first resonator and the second resonator;

exposing the first resonator and the second resonator to an RF signal;

feeding RF power to the second resonator via a feeding structure, wherein the feeding structure is connected to the loop conductor;

inducing the RF power to the first resonator coupled to the second resonator;

exciting the first resonator and the second resonator to operate at an operating frequency;

tuning the first resonator using the conductive member and the second resonator using the RFID chip to resonate at the operating frequency; and radiating an output RF signal in response to the fed RF signal.

31. The method of claim 30, wherein exposing comprises interrogating the RFID device via an interrogator, wherein the interrogation interrogating includes transmission of an interrogation signal to retrieve data from the RFID device through RFID chip.

32. The method of claim 30, wherein the operating frequency is a composite frequency of the RFID device, wherein the operating frequency comprises a first frequency or a second frequency.

33. The method of claim 30, wherein tuning comprises:

performing impedance matching for the first resonator with a capacitive reactance of the conductive member to operate at the operating frequency; or performing impedance matching for the second resonator with the RFID chip to operate at the operating frequency.

34. The method of claim 30, further comprising forming the first resonator and the second resonator on a substrate.

* * * * *